(12) United States Patent
Yokota

(10) Patent No.: US 11,318,943 B2
(45) Date of Patent: May 3, 2022

(54) VEHICLE CONTROL DEVICE

(71) Applicant: TOYOTA JIDOSHA KABUSHIKI KAISHA, Toyota (JP)

(72) Inventor: Takahiro Yokota, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 143 days.

(21) Appl. No.: 16/733,930

(22) Filed: Jan. 3, 2020

(65) Prior Publication Data

US 2020/0231153 A1 Jul. 23, 2020

(30) Foreign Application Priority Data

Jan. 23, 2019 (JP) .............................. JP2019-009686

(51) Int. Cl.
| | | |
|---|---|---|
| *B60W 30/18* | (2012.01) | |
| *B60W 10/04* | (2006.01) | |
| *B60W 10/18* | (2012.01) | |
| *B60W 50/00* | (2006.01) | |

(52) U.S. Cl.
CPC ............ *B60W 30/18* (2013.01); *B60W 10/04* (2013.01); *B60W 10/18* (2013.01); *B60W 50/00* (2013.01); *B60W 2400/00* (2013.01); *B60W 2520/10* (2013.01); *B60W 2552/15* (2020.02); *B60W 2710/18* (2013.01); *B60W 2720/10* (2013.01)

(58) Field of Classification Search
CPC .... B60T 2201/06; B60T 7/122; B60W 10/04; B60W 10/18; B60W 10/184; B60W 2400/00; B60W 2520/10; B60W 2520/105; B60W 2552/15; B60W 2710/0666; B60W 2710/18; B60W 2710/182; B60W 2720/10; B60W 30/18; B60W 30/18118; B60W 50/00
See application file for complete search history.

(56) References Cited

U.S. PATENT DOCUMENTS

2005/0246081 A1* 11/2005 Bonnet .................. B60T 7/122
701/38
2007/0270281 A1* 11/2007 Inoue ............... B60W 30/18118
477/180

(Continued)

FOREIGN PATENT DOCUMENTS

EP      3006283 A1 *  4/2016   ............ B60T 13/662
EP      3006283 A1    4/2016

(Continued)

*Primary Examiner* — Babar Sarwar
(74) *Attorney, Agent, or Firm* — Sughrue Mion, PLLC

(57) ABSTRACT

A vehicle control device is mounted on a vehicle including a driving actuator configured to apply a driving force and a braking actuator configured to apply a braking force. The vehicle control device includes a processor. The processor is configured to correct, when a predetermined condition including at least that the vehicle is decelerating is satisfied, the required driving force and the required braking force so as to increase the required driving force and the required braking force such that a sum of a magnitude of the required driving force and a magnitude of the required braking force is equal to or larger than a magnitude of the component of the gravity acting on the vehicle in the movement direction of the vehicle.

13 Claims, 11 Drawing Sheets

(56) References Cited

U.S. PATENT DOCUMENTS

| | | | | |
|---|---|---|---|---|
| 2011/0184615 A1* | 7/2011 | Marcus | ............... | B60L 50/16 |
| | | | | 701/58 |
| 2011/0307154 A1 | 12/2011 | Takeda | | |
| 2013/0060433 A1* | 3/2013 | Maruyama | ............. | B60T 7/122 |
| | | | | 701/53 |
| 2015/0120104 A1* | 4/2015 | Stefanon | ............. | B60W 10/06 |
| | | | | 701/22 |
| 2016/0167655 A1* | 6/2016 | Minami | ............. | B60W 30/188 |
| | | | | 477/176 |
| 2020/0290613 A1* | 9/2020 | Trainor | ............. | B60L 15/2018 |

FOREIGN PATENT DOCUMENTS

| | | | |
|---|---|---|---|
| JP | 2007-230477 | A | 9/2007 |
| JP | 2007-326427 | A | 12/2007 |
| JP | 2011-240801 | A | 12/2011 |
| JP | 2011-255808 | A | 12/2011 |
| JP | 2012-144157 | A | 8/2012 |
| JP | 2013-244781 | A | 12/2013 |
| JP | 2015-098307 | A | 5/2015 |
| JP | 2018-090064 | A | 6/2018 |
| WO | 2007/141631 | A2 | 12/2007 |
| WO | 2012/095717 | A2 | 7/2012 |

* cited by examiner

FIG. 10
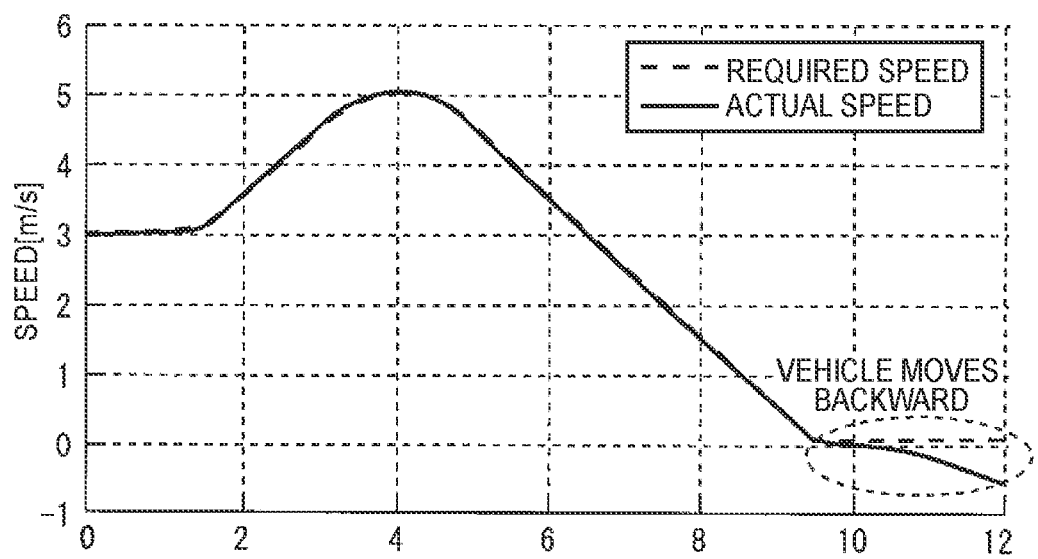
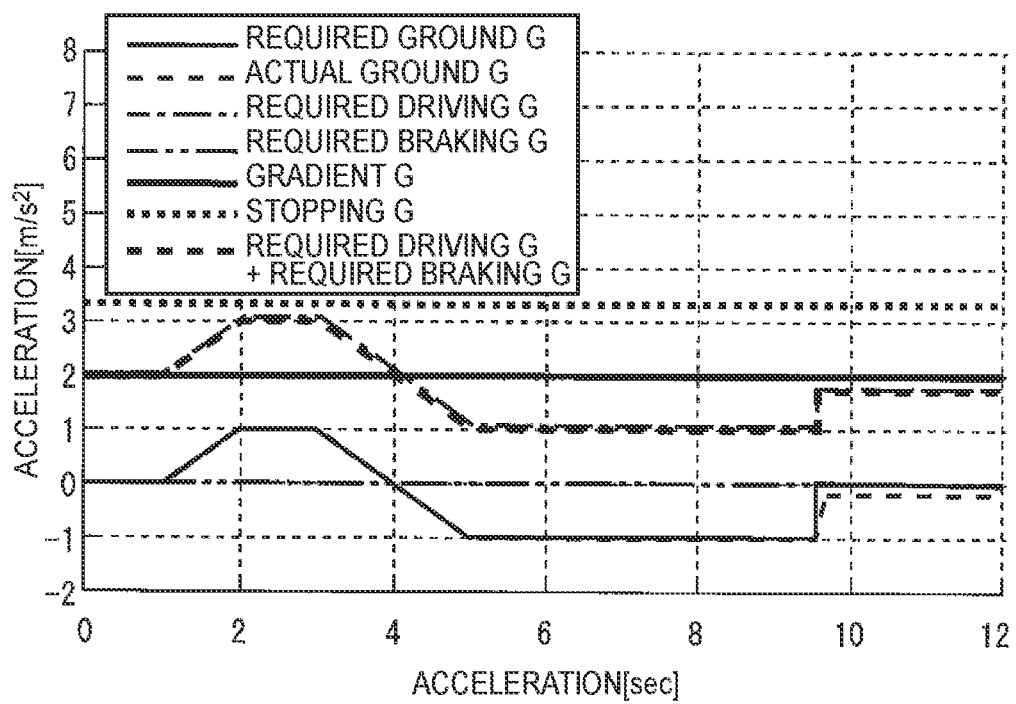

VEHICLE CONTROL DEVICE

INCORPORATION BY REFERENCE

The disclosure of Japanese Patent Application No. 2019-009686 filed on Jan. 23, 2019 including the specification, drawings and abstract is incorporated herein by reference in its entirety.

BACKGROUND

1. Technical Field

The present disclosure relates to a vehicle control device, and more particularly, to a vehicle control device including a driving actuator that applies a driving force and a braking actuator that applies a braking force.

2. Description of Related Art

Japanese Unexamined Patent Application Publication No. 2011-255808 (JP 2011-255808 A) discloses a related art for suppressing a vehicle traveling on an uphill road by automated traveling from slipping backward. According to the related art, a target axle torque is calculated based on a target acceleration of the vehicle and a traveling resistance of the vehicle including an influence of gravity in accordance with a road surface gradient, and an axle torque required of a driving actuator and an axle torque required of a braking actuator are determined based on the target axle torque. When the vehicle is predicted to slip backward while traveling on an uphill road, the target axle torque is corrected so as to increase a braking force by the braking actuator. Further, when the vehicle slips backward even after the target axle torque is corrected, a proportional gain of a feedback control for the target axle torque is increased so as to minimize a slip amount.

SUMMARY

In the related art, control is performed to inhibit the vehicle from slipping backward on the uphill road, and subsequent control is also performed in the case where the vehicle has slipped backward. That is, the related art does not exclude a possibility of the vehicle slipping backward on the uphill road. To eliminate a sense of discomfort felt by an occupant, it is desirable to highly reliably suppress backward movement of the vehicle on the uphill road. The present disclosure provides a vehicle control device capable of suppressing the backward movement of the vehicle on the uphill road.

A vehicle control device according to a first aspect of the present disclosure is mounted on a vehicle including a drive actuator configured to apply a driving force and a braking actuator configured to apply a braking force. The vehicle control device includes a processor. The processor is configured to set a required driving force required of the driving actuator and a required braking force required of the braking actuator, so that an acceleration acting on the vehicle in a movement direction of the vehicle satisfies a required acceleration based on the required acceleration for the vehicle and a component of gravity acting on the vehicle in the movement direction of the vehicle. The processor is configured to control the driving actuator based on the required driving force. The processor is configured to control the braking actuator based on the required braking force. The processor is configured to correct, when a predetermined condition including at least that the vehicle is decelerating is satisfied, the required driving force and the required braking force so as to increase the required driving force and the required braking force such that a sum of a magnitude of the required driving force and a magnitude of the required braking force is equal to or larger than a magnitude of the component of the gravity acting on the vehicle in the movement direction of the vehicle.

In the vehicle control device according to the first aspect of the present disclosure, when the predetermined condition including at least that the vehicle is decelerating is satisfied, the processor corrects the required driving force and the required braking force so as to increase the required driving force and the required braking force such that the sum of the magnitude of the required driving force and the magnitude of the required braking force is equal to or larger than the magnitude of the component of the gravity acting on the vehicle in the movement direction of the vehicle. When the vehicle is decelerating, the vehicle is likely to stop before long, and the vehicle may stop on the uphill road. Further, when the vehicle is traveling on the uphill road, the component of the gravity acting on the vehicle in the movement direction of the vehicle acts in the direction in which the vehicle moves backward. Therefore, when the above-mentioned predetermined condition is satisfied before the vehicle is stopped, by setting the sum of the magnitude of the required driving force and the magnitude of the required braking force to be equal to or larger than the magnitude of the component of the gravity acting on the vehicle in the movement direction of the vehicle, it is possible to suppress the vehicle after being stopped from moving backward without being affected by a response delay of the braking actuator or the driving actuator. When only the braking force is corrected so as to be increased, an excessive deceleration force may be applied to the vehicle. However, correcting each of the required driving force and the required braking force so as to increase the required driving force and the required braking force can suppress the deceleration from becoming insufficient or excessive with respect to the required acceleration.

In the vehicle control device according to the first aspect of the present disclosure, the predetermined condition, that is, a correction performing condition that is a condition for performing the process of correcting the required driving force and the required braking force so as to increase the required driving force and the required braking force, may include that each of an actual speed and a required speed of the vehicle are smaller than a predetermined speed. In the vehicle control device according to the first aspect of the present disclosure, the predetermined condition may include that the vehicle is traveling on an uphill road. Furthermore, in the vehicle control device according to the first aspect of the present disclosure, the predetermined condition may include that the magnitude of the component of the gravity acting on the vehicle in the movement direction of the vehicle is larger than the sum of the magnitude of the required driving force and the magnitude of the required braking force. In the vehicle control device according to the first aspect of the present disclosure, the predetermined condition may include at least one of the conditions described above in addition to that the vehicle is decelerating, thereby making it possible to more accurately determine that the vehicle will stop in the near future.

In the vehicle control device according to the first aspect of the present disclosure, the processor may be configured to correct the required driving force and the required braking force so as to increase the required driving force and the required braking force by a same value. In the vehicle control device according to the first aspect of the present disclosure, the increase in the driving force and the increase in the braking force cancel out each other until the vehicle is stopped, so that a change in the deceleration of the vehicle can be suppressed. Further, in the vehicle control device according to the first aspect of the present disclosure, the processor may be configured to set a value that is equal to or larger than half of a value obtained by subtracting the sum of the magnitude of the required driving force and the magnitude of the required braking force from the magnitude of the component of the gravity acting on the vehicle in the movement direction of the vehicle, as a raised amount for each of the required driving force and the required braking force, and to correct the required driving force and the required braking force so as to increase the required driving force and the required braking force by the raised amount.

In the vehicle control device according to the first aspect of the present disclosure, the processor may be configured to gradually increase, when the predetermined condition is satisfied, the required driving force and the required braking force to a corrected required driving force and the corrected required braking force. In the vehicle control device according to the first aspect of the present disclosure, a sudden change in the deceleration of the vehicle can be suppressed.

Further, in the vehicle control device according to the first aspect of the present disclosure, the processor may be configured to recorrect, when a condition of the vehicle transitions from a deceleration state to an acceleration state or a constant traveling state after the predetermined condition is satisfied, the required driving force and the required braking force, which have been corrected so as to be increased, so as to reduce the required driving force and the required braking force. In the vehicle control device according to the first aspect of the present disclosure, it is possible to suppress a decrease in fuel efficiency due to shifting to an acceleration state or a constant traveling state while maintaining the braking force. In the vehicle control device according to the first aspect of the present disclosure, the processor may be configured to gradually reduce, when the condition of the vehicle transitions from the deceleration state to the acceleration state or the constant traveling state after the predetermined condition is satisfied, the required driving force and the required braking force, which have been corrected so as to be increased, toward the required driving force and the required braking force before being subjected to correction. In the vehicle control device according to the first aspect of the present disclosure, it is possible to suppress disturbance in a behavior of the vehicle due to a sudden change in the driving force or the braking force.

Further, in the vehicle control device according to the first aspect of the present disclosure, the processor may be configured to reduce the required driving force or increase the required braking force when a decrease in followability of the actual speed of the vehicle with respect to the required speed of the vehicle is confirmed after the predetermined condition is satisfied and the required driving force and the required braking force is corrected so as to be increased. In the vehicle control device according to the first aspect of the present disclosure, it is possible to improve a speed followability that has decreased due to errors in operations of the braking actuator and the driving actuator.

A vehicle control device according to a second aspect of the present disclosure is mounted on a vehicle including a driving actuator configured to apply a driving force and a braking actuator configured to apply a braking force. The vehicle control device includes a processor. The processor is configured to set a required driving force required of the driving actuator and a required braking force required of the braking actuator, so that an acceleration acting on the vehicle in a movement direction of the vehicle satisfies a required acceleration based on the required acceleration for the vehicle and a component of gravity acting on the vehicle in the movement direction of the vehicle. The processor is configured to control the driving actuator based on the required driving force. The processor is configured to control the braking actuator based on the required braking force. The processor is configured to correct, when a predetermined condition including at least that each of an actual speed of the vehicle and a required speed of the vehicle is smaller than a predetermined speed is satisfied, the required driving force and the required braking force so as to increase the required driving force and the required braking force such that a sum of a magnitude of the required driving force and a magnitude of the required braking force is equal to or larger than a magnitude of the component of the gravity acting on the vehicle in the movement direction of the vehicle. When both the actual speed and the required speed of the vehicle are low, the vehicle is likely to stop before long, and the vehicle may stop on the uphill road. Therefore, when the above-mentioned predetermined condition (correction performing condition) is satisfied before the vehicle is stopped, by setting the sum of the magnitude of the required driving force and the magnitude of the required braking force equal to or larger than the magnitude of the component of the gravity acting on the vehicle in the movement direction of the vehicle, it is possible to suppress the vehicle after being stopped from moving backward without being affected by the response delay of the braking actuator or the driving actuator.

A vehicle control device according to a third aspect of the present disclosure is mounted on a vehicle including a driving actuator configured to apply a driving force and a braking actuator configured to apply a braking force. The vehicle control device includes a processor. The processor is configured to set a required driving force required of the driving actuator and a required braking force required of the braking actuator, so that an acceleration acting on the vehicle in a movement direction of the vehicle satisfies a required acceleration based on the required acceleration for the vehicle and a component of gravity acting on the vehicle in the movement direction of the vehicle. The processor is configured to control the driving actuator based on the required driving force. The processor is configured to control the braking actuator based on the required braking force. The processor is configured to correct, when a predetermined condition including at least that the vehicle is traveling on an uphill road is satisfied, the required driving force and the required braking force so as to increase the required driving force and the required braking force such that a sum of a magnitude of the required driving force and a magnitude of the required braking force is equal to or larger than a magnitude of the component of the gravity acting on the vehicle in the movement direction of the vehicle. When the vehicle is traveling on an uphill road, the vehicle may stop on the uphill road. Therefore, when the above-mentioned predetermined condition (correction performing condition) is satisfied before the vehicle is stopped, by setting the sum of the magnitude of the required driving force and the magnitude of the required braking force equal to or larger than the magnitude of the component of the gravity acting on the vehicle in the movement direction of the vehicle, it is possible to suppress the vehicle after being stopped from moving backward without being affected by the response delay of the braking actuator or the driving actuator.

A vehicle control device according to a fourth aspect of the present disclosure is mounted on a vehicle including a drive actuator configured to apply a driving force and a braking actuator configured to apply a braking force. The vehicle control device includes a processor. The processor is configured to set a required driving force required of the driving actuator and a required braking force required of the braking actuator, so that an acceleration acting on the vehicle in a movement direction of the vehicle satisfies a required acceleration based on the required acceleration for the vehicle and a component of gravity acting on the vehicle in the movement direction of the vehicle. The processor is configured to control the driving actuator based on the required driving force. The processor is configured to control the braking actuator based on the required braking force. The processor is configured to correct, when a predetermined condition including at least that a magnitude of the component of the gravity acting on the vehicle in the movement direction of the vehicle is larger than a sum of a magnitude of the required driving force and a magnitude of the required braking force is satisfied, the required driving force and the required braking force so as to increase the required driving force and the required braking force such that the sum of the magnitude of the required driving force and the magnitude of the required braking force is equal to or larger than the magnitude of the component of the gravity acting on the vehicle in the movement direction of the vehicle. When the magnitude of the component of the gravity acting on the vehicle in the movement direction of the vehicle is larger than the sum of the magnitude of the required driving force and the magnitude of the required braking force, the vehicle is likely to stop before long, and the vehicle may stop on the uphill road. Therefore, when the above-mentioned predetermined condition (correction performing condition) is satisfied before the vehicle is stopped, by setting the sum of the magnitude of the required driving force and the magnitude of the required braking force equal to or larger than the magnitude of the gravity component acting on the vehicle in the movement direction of the vehicle, it is possible to suppress the vehicle after being stopped from moving backward without being affected by the response delay of the braking actuator or the driving actuator.

In the vehicle control device according to the first to fourth aspects of the present disclosure, when the correction performing condition is satisfied before the vehicle is stopped, by correcting the required driving force and the required braking force so as to increase the required driving force and the required braking force and setting the sum of the magnitude of the required driving force and the magnitude of the required braking force equal to or larger than the magnitude of the component of the gravity acting on the vehicle in the movement direction of the vehicle, it is possible to suppress the vehicle traveling on the uphill road from moving backward without being affected by the response delay of the braking actuator or the driving actuator.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 10 shows graphs illustrating a result of a braking force/driving force control of a comparative example;

DETAILED DESCRIPTION OF EMBODIMENTS

Hereinafter, embodiments of the present disclosure will be described with reference to the drawings. When referring to the number, quantity, range, and the like of elements in the embodiments described below, unless otherwise specified or theoretically clearly specifiable to a certain number, the applicable embodiment is not limited to the number that is referred to in the embodiments. Further, structures, steps, and the like described in the embodiments below are not necessarily essential to the applicable embodiment unless otherwise specified or theoretically clearly specifiable.

1. Outline of Braking Force/Driving Force Control

Figure 1:
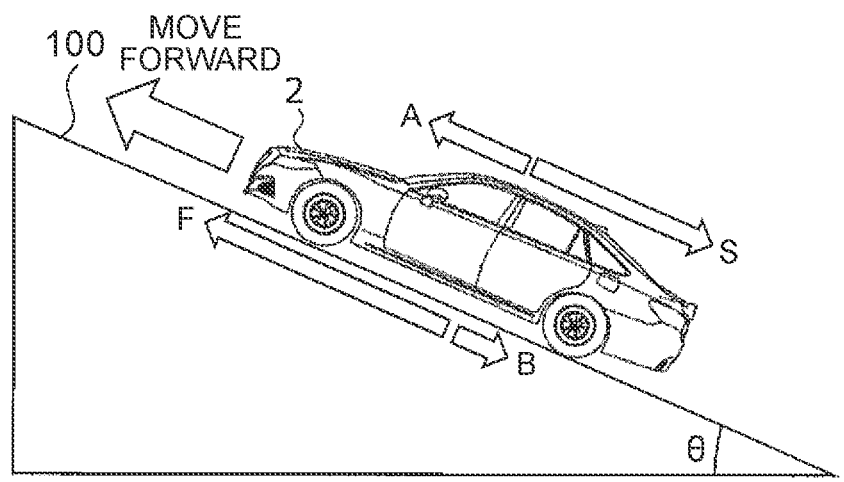
FIG. 1 is a diagram showing a balance of forces during acceleration of a vehicle traveling on an uphill road.
Figure 2:
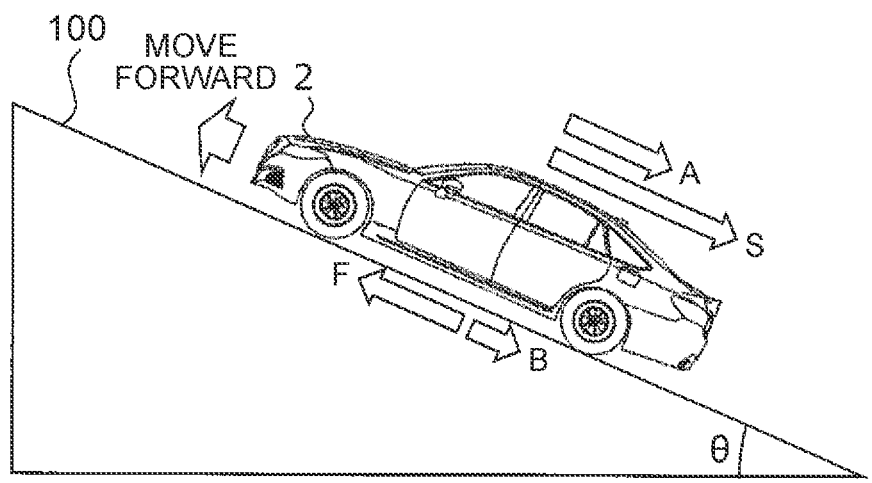
FIG. 2 is a diagram showing a balance of forces during deceleration of the vehicle traveling on the uphill road.

First, an outline of a braking force/driving force control according to an embodiment of the present disclosure will be described with reference to FIG. 1 to FIG. 7. FIG. 1 and FIG. 2 are diagrams showing a balance of forces of a vehicle 2 traveling on an uphill road 100. When the balance of the forces acting in a direction parallel to a road surface, that is, a movement direction of the vehicle 2 is observed, a component S of gravity acting in the movement direction of the vehicle 2, a driving force F, and a braking force B act on the vehicle 2 traveling on the uphill road 100. The component S of the gravity acting in the movement direction of the vehicle 2 (hereinafter simply referred to as a gravity component) is a force acting in a direction in which the vehicle 2 moves backward. When a gradient angle of the uphill road 100 is represented by θ, and the gravity acting on the vehicle 2 (vehicle weight) is represented by W, the component S can be represented by W×sinθ. Thus, the gravity component S increases as the gradient angle θ increases. The driving force F is a force acting in the traveling direction of the vehicle 2, and the braking force B is a force acting in the direction opposite to the traveling direction of the vehicle 2.

During acceleration of the vehicle 2 traveling on the uphill road 100, the driving force F is larger than a resultant force of the gravity component S and the braking force B, and as shown in FIG. 1, an acceleration force A acts on the vehicle 2 in its traveling direction. Meanwhile, during deceleration of the vehicle 2 traveling on the uphill road 100, the driving force F is smaller than the resultant force of the gravity component S and the braking force B, and as shown in FIG. 2, a deceleration force A acts on the vehicle 2 in the direction opposite to its traveling direction. When the deceleration force corresponds to a negative value of the acceleration force, the following relational equation is established among the driving force F, the braking force B, the gravity component S, and the acceleration force A.

$$F = B + S + A \qquad \text{Equation 1}$$

Next, a balance of the forces when the vehicle 2 is stopped on the uphill road 100 is considered. The gravity component S acts on the vehicle 2 stopped on the uphill road 100 in the direction in which the vehicle moves backward. When the driving force F is applied to the vehicle 2 in this state, if a magnitude of the driving force F exceeds a magnitude of the gravity component S, the vehicle 2 attempts to move forward on the uphill road 100. In order to keep the vehicle 2 in a stopped state, it is necessary to apply a braking force B, to the vehicle 2, which is larger than an excess of the driving force F with respect to the gravity component S. In this case, the braking force B acts on the vehicle 2 in the direction opposite to that of the driving force F. A condition for inhibiting the stopped vehicle 2 from moving forward is represented by the following equation.

$$F \leq B + S \qquad \text{Equation 2}$$

Meanwhile, if the magnitude of the driving force F is smaller than the magnitude of the gravity component S, the vehicle 2 attempts to move backward on the uphill road 100. In order to keep the vehicle 2 in the stopped state, it is necessary to apply a braking force B to the vehicle 2. The braking force B is larger than a deficiency of the driving force F with respect to the gravity component S. In this case, the braking force B acts on the vehicle 2 in the same direction as that of the driving force F. A condition for inhibiting the stopped vehicle 2 from moving backward is represented by the following equation.

$$F \geq -B + S \qquad \text{Equation 3}$$

Figure 3:
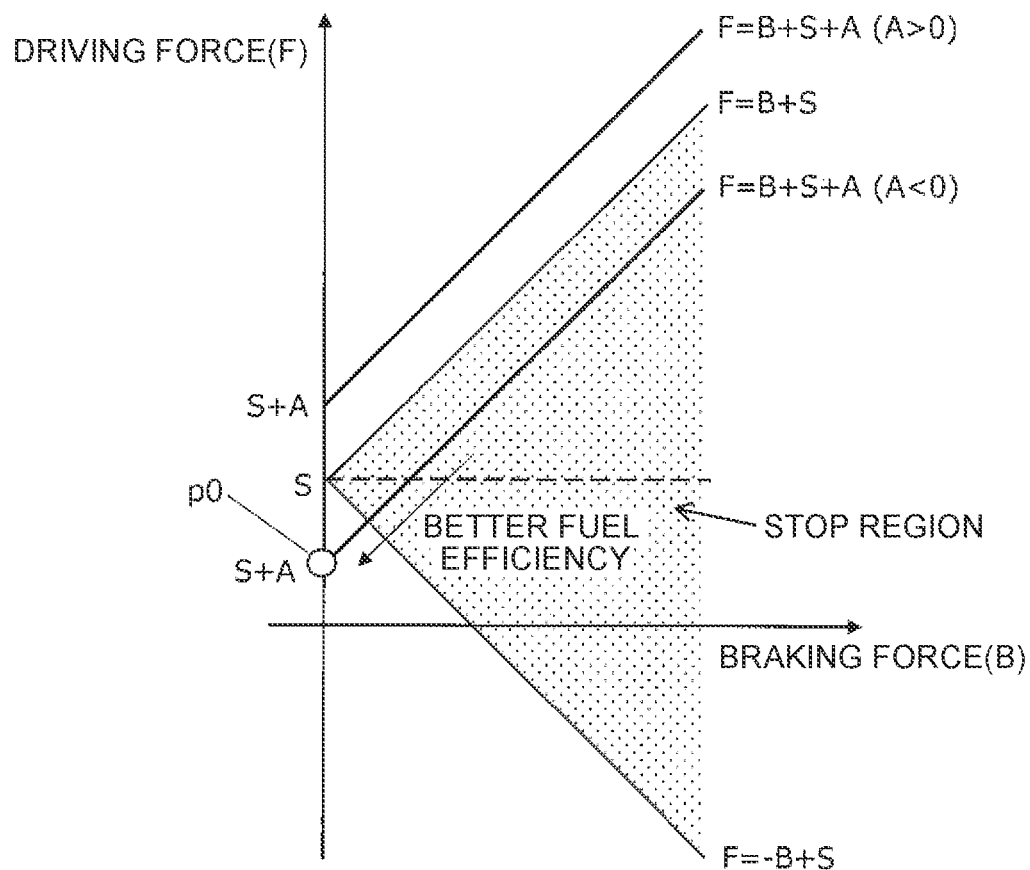
FIG. 3 is a graph showing a relationship between a driving force and a braking force in which the vehicle does not start moving when the vehicle is stopped.

FIG. 3 is a graph showing a relationship between the driving force F and the braking force B for inhibiting the vehicle 2 from moving from the stopped state, which is represented by Equation 2 and Equation 3. In the graph, a hatched stop area is an area where the relationship between the driving force F and the braking force B in which the stopped vehicle 2 does not move is maintained. Specifically, in a region where the driving force F is larger than the gravity component S and equal to or smaller than a sum of the braking force B and the gravity component S, the braking force B acts on the vehicle 2 in the direction opposite to its traveling direction. Thus, the vehicle 2 is inhibited from moving forward. In a region where the driving force F is smaller than the gravity component S and equal to or larger than a difference of the braking force B and the gravity component S, the braking force B acts on the vehicle 2 in the same direction as its traveling direction. Thus, the vehicle 2 is inhibited from moving backward.

The graph shows straight lines indicating the relationship between the driving force F, the braking force B, the gravity component S, and the acceleration force A during acceleration and deceleration. During acceleration, that is, when the acceleration force A is larger than zero, the vehicle 2 does not stop on the uphill road 100. However, during deceleration, that is, when the acceleration force A is smaller than zero, the vehicle 2 may eventually stop on the uphill road 100. When the vehicle 2 is decelerated and stopped, to suppress the driving force F from being consumed by the braking force B in terms of fuel efficiency, it is preferable that the braking force B is not output and a desired deceleration force (a negative value of the acceleration force) A is achieved only by adjusting the driving force F. In other words, during deceleration, it is desirable that the vehicle 2 travels at an operating point represented by the point p0 in the graph or an operating point close thereto.

Figure 4:
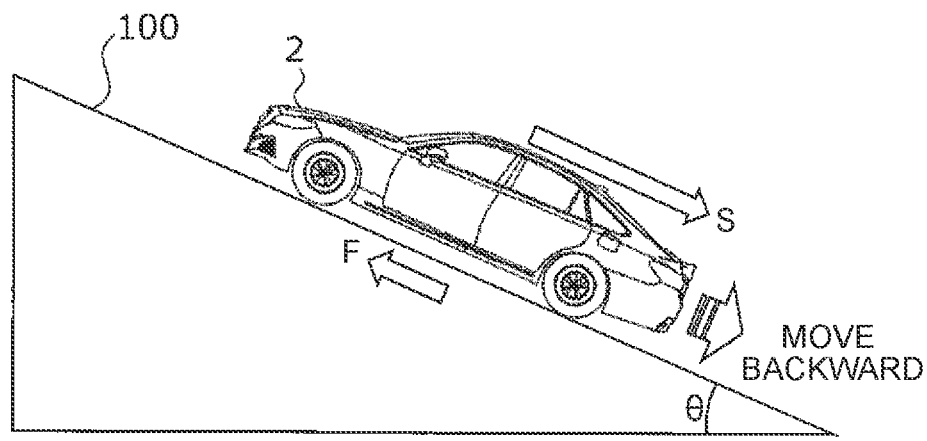
FIG. 4 is a diagram describing a condition for the vehicle that is stopped on the uphill road to move backward.
Figure 5:
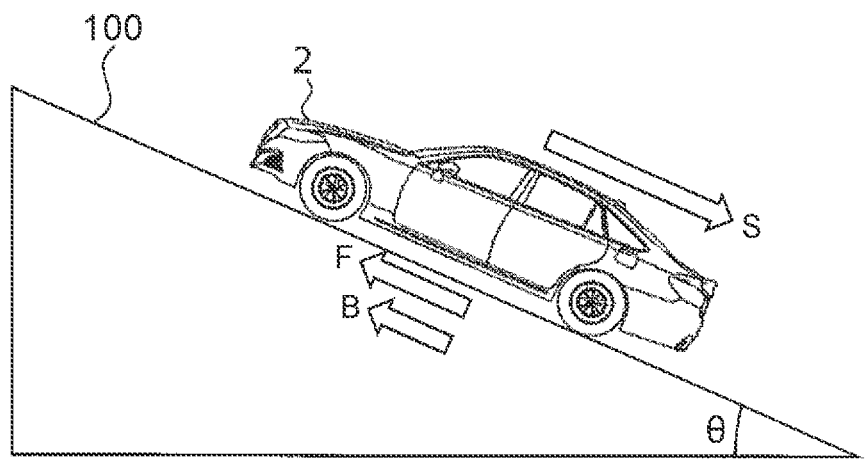
FIG. 5 is a diagram showing a balance of forces of the vehicle stopped on the uphill road.

However, as shown in FIG. 4, at the operating point p0, the gravity component S is larger than the driving force F, so the vehicle 2 starts to move backward after stopping once. At that time, even if it is required that the braking force B immediately increase, the braking force B does not increase immediately due to a response delay of a braking actuator. Similarly, there is also a response delay in a driving actuator that generates the driving force F. Thus, in order to inhibit the vehicle 2 from moving backward after being stopped, it is required that the balance of forces shown in FIG. 5 is achieved when the vehicle 2 is stopped even if the vehicle 2 travels at the operating point p0 during deceleration. That is, the sum of the magnitude of the braking force B and the magnitude of the driving force F needs to be equal to or larger than the magnitude of the gravity component S.

Figure 6:
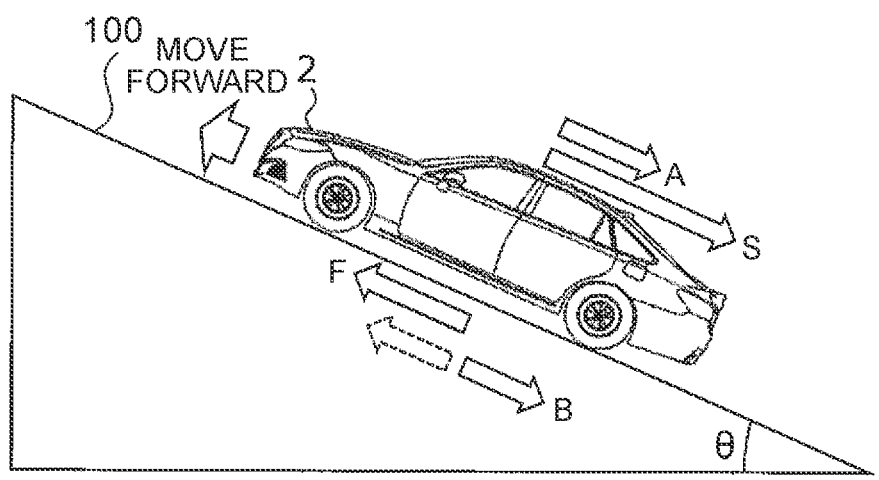
FIG. 6 is a diagram describing a condition for inhibiting the vehicle traveling on the uphill road from moving backward when the vehicle stops.

As described above, it is difficult to increase the braking force B immediately after the vehicle is stopped due to the response delay of the braking actuator. In this case, as shown in FIG. 6, output of the braking force B required after the vehicle is stopped may be started in advance during deceleration. When the output of the braking force B is started during deceleration while the vehicle 2 is traveling, the braking force B acts in the direction opposite to that of the driving force F. However, after the vehicle 2 is stopped, the braking force B acts in the same direction as that of the driving force F, that is, the direction that inhibits the vehicle 2 from moving backward, as indicated by the dashed line. Note that if the output of the braking force B is started during deceleration, the deceleration force A acting on the vehicle 2 may become excessive. This issue can be solved by increasing the driving force F in advance by an amount that the driving force F is canceled out by the braking force B.

A process for inhibiting the vehicle 2 traveling on the uphill road 100 described with reference to FIG. 6 from moving backward when the vehicle 2 stops will be described in more detail with reference to a graph shown in FIG. 7. The graph shows a plurality of operating points of the vehicle 2 defined by the driving force F and the braking force B. Here, it is assumed that the operating point of the vehicle 2 during deceleration is set to the operating point p0, for example. The closer the operating point is to the operating point p0, the more decrease in fuel efficiency during deceleration can be suppressed. However, the vehicle 2 starts to move backward after being stopped in this state. Thus, if a predetermined stopping condition including that the vehicle 2 is decelerating is satisfied, the operating point is shifted to the stop region in the graph to prepare for the vehicle 2 to be stopped.

In the graph, operating points p1, p1a, p1b, and p1c are shown as examples of the operating points within the stop region. Any of the operating points is allowed if the goal is only to inhibit the vehicle 2 from moving backward after being stopped. However, in terms of fuel efficiency, the smaller the driving force F while the vehicle 2 is being stopped is, the better. That is, the operating points p1 and p1c are preferable to the operating points p1a and p1b. Meanwhile, in terms of continuity of deceleration, the same deceleration force A as that of the operating point p0 is preferably obtained. That is, the operating points p1 and p1a are preferable to the operating points p1b and p1c. An occupant may feel a sense of discomfort due to a decrease in deceleration at the operating point p1b and an increase in deceleration at the operating point p1c. As an overall result, when preparing to stop the vehicle 2, it is preferable to shift the operating point from the operating point p0 to the operating point p1. The operating point p1 is an operating point at which the same deceleration force A as that of the operating point p0 is obtained, that is, an operating point that can satisfy the relationship represented by Equation 1 with the same deceleration force A as that of the operating point p0. The operating point p1 is also an operating point at which the relationship represented by Equation 3 can be satisfied with a minimum driving force F.

2. Configuration of Vehicle Control Device

Next, the configuration of the vehicle control device for performing the braking force/driving force control described above will be described. Here, as an embodiment of the present disclosure, an example in which the braking force/driving force control is performed in a vehicle control device that performs driving assist control at an automated driving level of level 1 or higher, based on the automated driving level defined by the Society of Automotive Engineers (SAE), is described. The driving assist control at the automated driving level of level 1 or higher includes, for example, autonomous driving system (ADS) and adaptive cruise control (ACC). Here, an example in which the present disclosure is applied to a vehicle control device including the ADS will be described.

Figure 8:
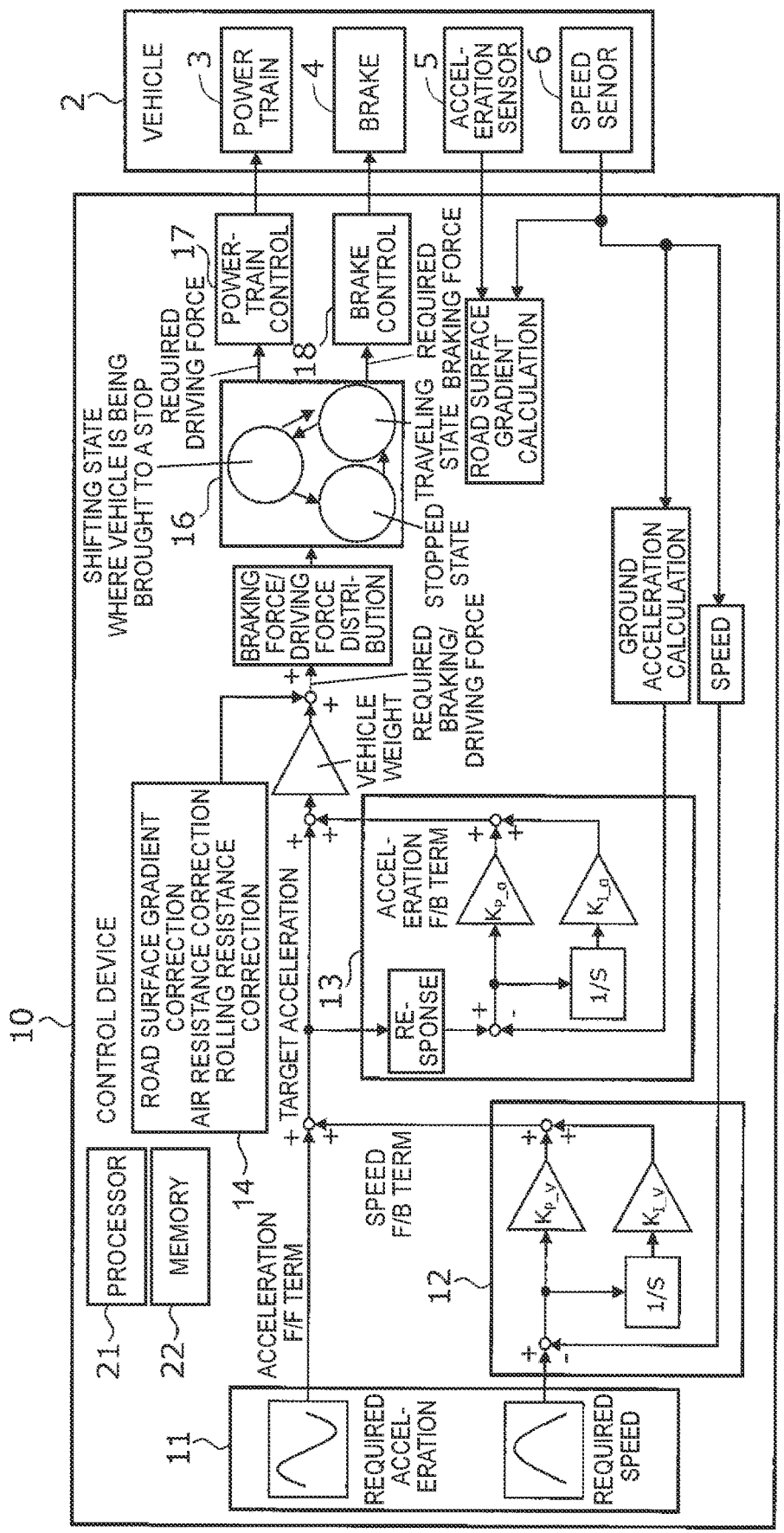
FIG. 8 is a control block diagram of a vehicle control device according to a first embodiment of the present disclosure.

FIG. 8 is a control block diagram of the vehicle control device according to the embodiment of the present disclosure. As will be described later, the present specification discloses two embodiments relating to the braking force/driving force control. The configuration of the vehicle control device 10 shown in FIG. 8 can be applied to the braking force/driving force control according to either embodiment. The vehicle control device 10 is applied to the vehicle 2 in which the driving actuator and the braking actuator can be operated independently. For example, in the embodiment, a hybrid powertrain 3 in which an internal combustion engine and an electric motor are combined to each other is provided as the driving actuator. A hydraulic brake 4 is provided as a braking actuator. In addition, at least an acceleration sensor 5 and a wheel speed sensor serving as a speed sensor 6 are mounted on the vehicle 2 as means for acquiring information related to a traveling state of the vehicle 2. Information acquired by the sensors 5 and 6 is taken into the vehicle control device 10.

The vehicle control device 10 is an electronic control unit (ECU) having at least one processor 21 and at least one memory 22. The memory 22 stores various pieces of data including a map, and various programs. The processor 21 reads and executes the program stored in the memory 22, thereby achieving various functions described below in the vehicle control device 10. Note that the vehicle control device 10 may be a set of a plurality of ECUs.

The vehicle control device 10 includes a planner 11. The planner 11 calculates a required acceleration and a required speed when the vehicle 2 travels along a set travel route from the present over a predetermined period in the future, and updates them at a constant cycle. The acceleration represents an acceleration in the movement direction of the vehicle 2, that is, a ground acceleration, and the speed represents a speed in the movement direction of the vehicle 2, that is, a ground speed. The required acceleration and the required speed are calculated to maintain a distance from a preceding vehicle, adjust a vehicle speed so as not to exceed a set vehicle speed, adjust the vehicle speed so that a lateral acceleration does not exceed a specified value, and the like.

The vehicle control device 10 calculates a target acceleration composed of an acceleration feedforward term and a speed feedback term. The required acceleration calculated by the planner 11 is used as the acceleration feedforward term (hereinafter referred to as the acceleration F/F term) of the target acceleration. The speed feedback term (hereinafter referred to as the speed F/B term) is a feedback term for making an actual speed of the vehicle 2 obtained by the speed sensor 6 match the required speed. The speed F/B term is calculated by a speed F/B term calculation unit 12 of the vehicle control device 10. The speed F/B term calculation unit 12 calculates a deviation between the required speed and the actual speed obtained from the vehicle 2, and calculates the speed F/B term by proportional-integral control with respect to the deviation.

The vehicle control device 10 adds an acceleration feedback term for making an actual acceleration of the vehicle 2 obtained by the speed sensor 6 match the target acceleration. The acceleration feedback term (hereinafter referred to as the acceleration F/B term) is calculated by an acceleration F/B term calculation unit 13 of the vehicle control device 10. The acceleration F/B term calculation unit 13 corrects a response of the target acceleration by a response delay of the vehicle 2 for a braking operation or a driving operation, and calculates a deviation between the corrected target acceleration and the actual ground acceleration obtained from the vehicle 2. Then, the acceleration F/B term calculation unit 13 calculates the acceleration F/B term by proportional-integral control with respect to the deviation.

The vehicle control device 10 calculates a required acceleration force based on a corrected target acceleration obtained by adding the acceleration F/B term to the target acceleration. Specifically, first, the vehicle control device 10 multiplies the corrected target acceleration by a vehicle weight of the vehicle 2 and converts the corrected target acceleration into an acceleration force so as to calculate the required acceleration.

Next, the vehicle control device 10 calculates acceleration force correction terms for various corrections such as road surface gradient correction, air resistance correction, and rolling resistance correction. The acceleration force correction term is calculated by an acceleration force correction term calculation unit 14. The vehicle control device 10 calculates a required braking/driving force by adding the acceleration force correction term to the required acceleration force converted from the corrected target acceleration. Of these correction terms, the road surface gradient correction term is a component of gravity acting on the vehicle 2 in the movement direction of the vehicle 2, and corresponds to the gravity component S shown in FIG. 1 on uphill roads. An estimated value of a gravitational acceleration acting on the vehicle 2 in the road surface direction is calculated from, for example, a difference between an acceleration obtained by the acceleration sensor 5 and a differential value of the vehicle speed obtained by the wheel speed sensor serving as the speed sensor 6. Further, by applying a current position of the vehicle 2 obtained by the Global Positioning System (GPS) to a map including road surface gradient information, the road surface gradient information on the current position of the vehicle 2 can be obtained.

The required braking/driving force corresponds to a value obtained by adding the gravity component S to the acceleration force A shown in FIG. 1 on the uphill road. The vehicle control device 10 distributes the required braking/driving force into the braking force and the driving force in a braking force/driving force distribution unit 15. This distribution is performed in accordance with a predetermined distribution rule giving priority to the best fuel efficiency, for example. During deceleration, for example, the required braking/driving force is distributed only to the driving force in a range where the required braking/driving force can be achieved by reducing the driving force. After the driving force is reduced to the minimum driving force that can be output by the powertrain 3, the remainder obtained by subtracting the minimum driving force from the required braking/driving force is distributed to the braking force. For example, during deceleration on an uphill road, the braking force and the driving force corresponding to the operating point p0 shown in the graph of FIG. 3 are calculated.

The vehicle control device 10 corrects the braking force and the driving force distributed from the required braking/driving force by a braking force/driving force correction unit 16. A powertrain control unit 17 that operates the powertrain 3 is provided with the corrected driving force as a required driving force. A brake control unit 18 that operates the brake 4 is provided with the corrected braking force as a required braking force. The powertrain control unit 17 operates the powertrain 3 with an operation amount required for achieving a required driving force. The operation amount of the powertrain 3 is, for example, a fuel injection amount when the vehicle is traveling with an internal combustion engine, and a current when the vehicle is traveling with an electric motor. The brake control unit 18 operates the brake 4 with an operation amount required for achieving the required braking force. Specifically, the operation amount of the brake 4 is a brake master pressure or a brake stroke amount.

The braking force/driving force correction unit 16 corrects the braking force and the driving force in accordance with traveling conditions of the vehicle 2 and transitions between the traveling conditions. The traveling conditions include the stopped state, the traveling state, and a shifting state where the traveling vehicle 2 is being brought to a stop. The braking force/driving force correction unit 16 determines the transitions between these traveling conditions as follows.

From Traveling State to Shifting State where Vehicle is being Brought to a Stop

The transition from the traveling state to the shifting state where the vehicle 2 is being brought to a stop requires that both of the following requirements are satisfied: the required acceleration calculated by the planner 11 is a negative value, that is, the deceleration is required (requirement 1); and the required speed calculated by the planner 11 and the actual speed obtained by the speed sensor 6 are each smaller than a predetermined minute speed (for example, 5 km/h) (requirement 2). However, the threshold values of the required speed and the actual speed may vary according to the required acceleration so that the threshold value increases as the required deceleration increases.

From Shifting State where Vehicle is being Brought to a Stop to Stopped State

The transition from the shifting state where the vehicle is being brought to a stop to the stopped state requires that the required speed calculated by the planner 11 and the actual speed obtained by the speed sensor 6 are both zero.

From Stopped State or Shifting State where Vehicle is being Brought to a Stop to Traveling State The transition from the stopped state to the traveling state or the transition from the shifting state where the vehicle is being brought to a stop to the traveling state requires that the required acceleration calculated by the planner 11 is a positive value.

Figure 7:
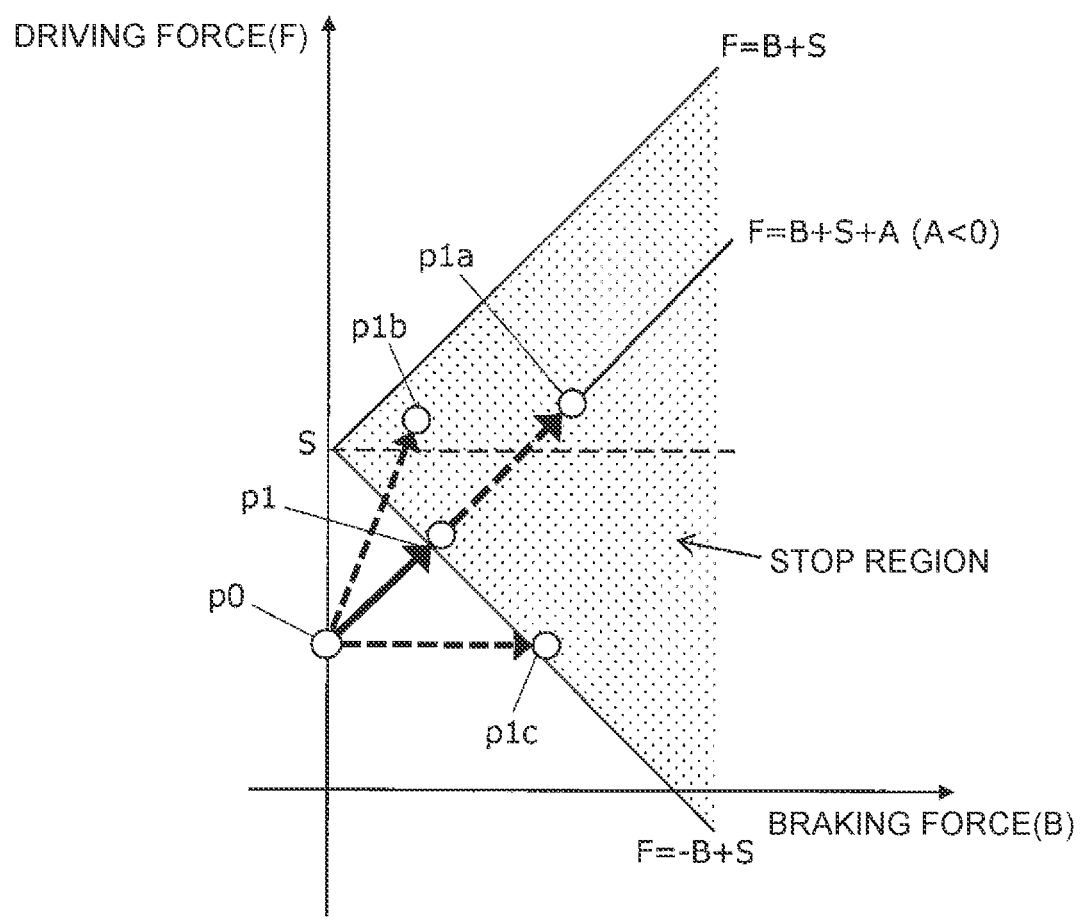
FIG. 7 is a graph describing a setting of a driving force and a braking force for inhibiting the vehicle traveling on the uphill road from moving backward when the vehicle stops.

For example, when the traveling condition of the vehicle 2 transitions from the traveling state to the shifting state where the vehicle 2 is being brought to a stop on the uphill road, the braking force/driving force correction unit 16 corrects the required driving force and the required braking force so as to obtain a driving force and a braking force that correspond to the operating point p1 shown in the graph of FIG. 7. However, the correction by the braking force/driving force correction unit 16 is not performed in all traveling conditions. For example, if the vehicle 2 is in a simple traveling state, no correction is performed, and the braking force and the driving force calculated by the braking force/driving force distribution unit 15 are directly used as the required braking force and the required driving force and provided to the powertrain control unit 17 and the brake control unit 18.

The braking force/driving force correction unit 16 and the braking force/driving force distribution unit 15 constitute a "setting unit". The powertrain control unit 17 and the brake control unit 18 constitute a "control unit". In the following chapter, details of the braking force/driving force control performed by the vehicle control device 10 including the correction of the braking force and the driving force performed by the braking force/driving force correction unit 16 will be described using a flowchart and a graph describing control results.

3. Details of Braking Force/Driving Force Control According to First Embodiment

Figure 9:
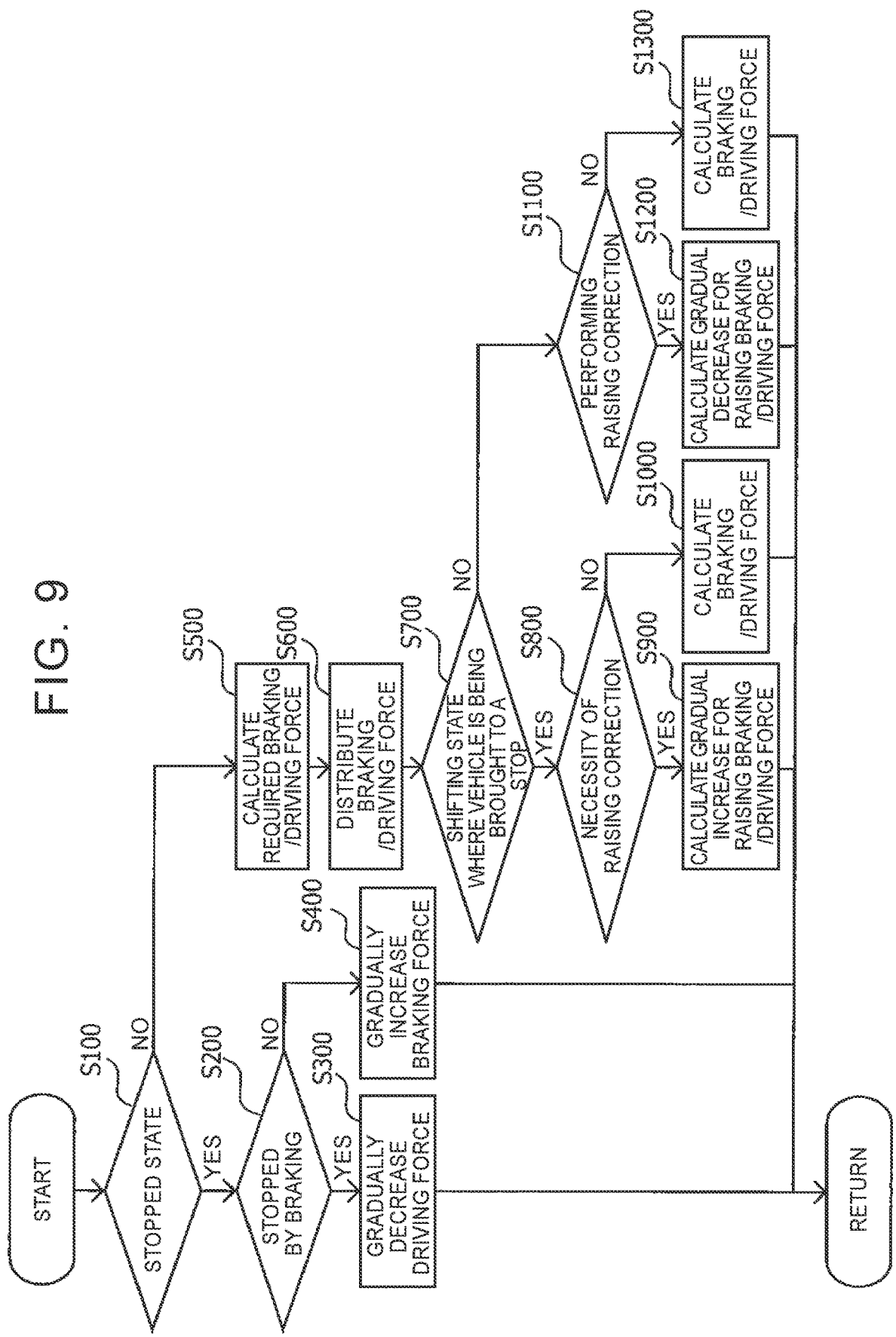
FIG. 9 is a flowchart showing a flow of a braking force/driving force control according to the first embodiment of the present disclosure.

FIG. 9 is a flowchart showing a flow of the braking force/driving force control performed by the vehicle control device 10 according to the first embodiment of the present disclosure. The vehicle control device 10 repeatedly performs the processes shown in the flowchart. Hereinafter, the flow of the braking force/driving force control according to the first embodiment will be described with reference to the flowchart.

First, in step S100, it is determined whether the vehicle 2 is in the stopped state. This determination is made based on, for example, the actual speed obtained by the speed sensor 6 and the required acceleration set by the planner 11. If the actual speed is zero and the required acceleration is zero, it may be determined that the vehicle 2 is in the stopped state.

If the vehicle 2 is in the stopped state, a determination in step S200 is made. In step S200, it is determined whether the vehicle 2 can be stopped only by the braking force of the brake 4. This determination can be made, for example, based on a comparison between the magnitude of the gravity component acting on the vehicle 2 in the movement direction of the vehicle 2 and the magnitude of the braking force generated by the brake 4. The magnitude of the gravity component acting on the vehicle 2 in the movement direction of the vehicle 2 can be obtained by the acceleration sensor 5. The magnitude of the braking force generated by the brake 4 can be calculated from the operation amount of the brake 4.

When the vehicle 2 can be stopped only by the braking force of the brake 4, the process in step S300 is performed. In step S300, the required driving force for the powertrain 3 is gradually decreased with a predetermined gradual decrease gradient to the minimum driving force that can be generated by the powertrain 3. An example of a value of the gradual decrease gradient is −20000 N/s. If the driving force is already the minimum driving force of the powertrain 3, the condition is maintained.

When the vehicle 2 cannot be stopped only by the braking force of the brake 4, the process in step S400 is performed. In step S400, the required braking force for the brake 4 is gradually increased with a predetermined gradual increase gradient to the maximum braking force calculated by the following Equation 4.

Maximum braking force=(|Estimated road surface gradient value|*(1+Road surface gradient gain error)+Road surface gradient offset error) *Maximum vehicle weight    Equation 4

In Equation 4, the estimated road surface gradient value is an estimated value of the gravitational acceleration in the road surface direction, and can be calculated, for example, as a difference between the acceleration obtained by the acceleration sensor 5 and the differential value of the vehicle speed obtained by the speed sensor 6. When the vehicle 2 is traveling on an uphill road, the estimated road surface gradient value is a positive value. When the vehicle 2 is traveling on a downhill road, the estimated road surface gradient value is a negative value. The road surface gradient gain error is a gain error of the estimated road surface gradient value, and may be set to 0.05 as an example. The road surface gradient offset error is an offset error of the estimated road surface gradient value, and may be set to 0.7 m/s$^2$ as an example. The maximum vehicle weight is a maximum weight of the vehicle 2 in consideration of the errors, and may be set to 1.2 times the standard vehicle weight as an example. According to Equation 4, even when errors occur in the estimated road surface gradient value or the vehicle weight, the maximum braking force is calculated in consideration of these errors so that the vehicle 2 can be inhibited from moving backward when the vehicle 2 stops. An example of the value of the gradual increase gradient is 5400 N/s.

If it is determined in step S100 that the vehicle 2 is not stopped, the processes in and after step S500 are performed. First, in step S500, the required braking/driving force is calculated. Next, in step S600, the required braking/driving force is distributed to the braking force and the driving force in accordance with a predetermined distribution rule. The calculation method of the required braking/driving force and the distribution method of the required braking/driving force are as already described in the description of the configuration of the vehicle control device 10.

Next, in step S700, it is determined whether the vehicle 2 is in the shifting state where the vehicle 2 is being brought to a stop. Whether the vehicle 2 is in the shifting state where the vehicle 2 is being brought to a stop is determined by whether a condition for the transition from the traveling state to the shifting state where the vehicle 2 is being brought to a stop is satisfied. To repeat, when the required acceleration calculated by the planner 11 is a negative value, and the required speed and the actual speed are each smaller than a predetermined minute speed, the vehicle 2 is determined to be in the shifting state where the vehicle 2 is being brought to a stop.

If the vehicle 2 is in the shifting state where the vehicle 2 is being brought to a stop, a determination in step S800 is made. In step S800, it is determined whether the required driving force and the required braking force need to be corrected so as to be raised to inhibit the vehicle 2 from moving backward when the vehicle 2 stops. Referring to the graph of FIG. 7, when the operating point of the vehicle 2 is in a region where the driving force F is smaller than the difference between the gravity component S and the braking force B, the vehicle 2 starts to move backward after stopping. In this case, the required driving force and the required braking force need to be corrected so as to be raised for each value calculated in step S600 so that the operating point of the vehicle 2 falls within the stop region in the graph.

Specifically, in step S800, first, required raising amounts of the required driving force and the required braking force are calculated by the following Equation 5. Referring to the graph of FIG. 7, the required raising amount is a raising amount required to cause the operating point of the vehicle 2 to fall within the stop region in consideration of the errors in the road surface gradient and the vehicle weight. The required raising amount of the required driving force and the required raising amount of the required braking force are set to the same value. This is to cause the raising amount of the driving force and the raising amount of the braking force to cancel out each other, so that a change in the deceleration before and after the raising process is suppressed.

Required raising amount=((Estimated road surface gradient value+|Estimated road surface gradient value|*Road surface gradient gain error+Road surface gradient offset error)*Vehicle maximum weight−Required driving force before correction−Required braking force before correction)/2    Equation 5

Subsequently, in step S800, it is determined whether the required raising amount calculated in Equation 5 is larger than zero. If the required raising amount is larger than zero, it is determined that the required driving force and the required braking force need to be corrected so as to be raised. If the required raising amount is equal to or smaller than zero, it means that the current operating point of the vehicle 2 is already within the stop region. Therefore, in that case, the vehicle 2 is not likely to move backward, and no further raising correction of the required driving force and the required braking force is required.

In order for the required raising amount to be larger than zero, the estimated road surface gradient value needs to be a positive value. That is, the fact that the vehicle 2 is traveling on an uphill road is one necessary condition for performing raising correction of the required driving force and the required braking force. In Equation 5, "Estimated road surface gradient value+|Estimated road surface gradient value|* Road surface gradient gain error+Road surface gradient offset error" represents the magnitude of the gravity component acting on the vehicle 2 in the movement direction of the vehicle 2 in consideration of the errors. Therefore, Equation 5 indicates that the fact that the magnitude of the gravity component acting on the vehicle 2 in the movement direction of the vehicle 2 is larger than the sum of the magnitude of the required driving force and the magnitude of the required braking force is a necessary and sufficient condition for performing the raising correction of the required driving force and the required braking force.

If it is determined in step S800 that the required driving force and the required braking force need to be corrected so as to be raised, the process in step S900 is performed. In step S900, the required braking force is not increased rapidly to the required raising amount, but gradually increased at a predetermined calculation cycle as shown in the following Equation 6 and Equation 7. Equation 6 indicates that a smaller value of the value, obtained by adding a braking force raising jerk multiplied by the calculation cycle to a previous value of a braking force raising amount, and the required raising amount is selected as the braking force raising amount. In Equation 6, the braking force raising jerk defines an increase rate of the required braking force in each calculation cycle. The previous value of the braking force raising amount in Equation 6 is reset to zero at a timing when the determination of whether the raising correction in step S800 is necessary has changed from necessary to unnecessary.

Braking force raising=min((Previous value of braking force raising amount+Braking force raising jerk*Calculation cycle),Required raising amount)  Equation 6

Required braking force after correction=Required braking force before correction+Braking force raising amount  Equation 7

Further, in step S900, the required driving force is not increased rapidly to the required raising amount, but gradually increased at a predetermined calculation cycle as shown in the following Equation 8 and Equation 9. The meaning of Equation 8 is similar to that of Equation 6. In Equation 8, a driving force raising jerk defines an increase rate of the required driving force in each calculation cycle. A previous value of the driving force raising amount in Equation 8 is reset to zero at a timing when the determination of whether the raising correction in step S800 is necessary has changed from necessary to unnecessary.

Driving force raising amount=min((Previous value of driving force raising amount+Driving force raising jerk*Calculation cycle),Required raising amount)  Equation 8

Required driving force after correction=Required driving force before correction+Driving force raising amount  Equation 9

In Equation 6 and Equation 8, the braking force raising jerk and the driving force raising jerk are set in consideration of an influence on a behavior of the vehicle 2. The braking force raising jerk and the driving force raising jerk may be set to 2.7 m/s$^3$ as an example. The calculation cycle is, for example, 10 ms. Note that the values of the braking force raising amount and the driving force raising amount may be processed by a response compensation filter in consideration of responsiveness of the brake 4 and the powertrain 3. Further, a time constant of the response compensation filter may be changed according to the traveling condition of the vehicle 2.

If it is determined in step S800 that the raising corrections of the required driving force and the required braking force are not necessary, the process in step S1000 is performed. In step S1000, the required braking force before correction is applied from the braking force/driving force correction unit 16 to the brake control unit 18, and the brake 4 is controlled according to the required braking force before correction. Further, the required driving force before correction is applied from the braking force/driving force correction unit 16 to the powertrain control unit 17, and the powertrain 3 is controlled according to the required driving force before correction.

Next, a case will be described in which, as a result of the determination in step S700, the vehicle 2 is not in the shifting state where the vehicle 2 is being brought to a stop. The case where the vehicle 2 is not in the stopped state and is not in the shifting state where the vehicle 2 is being brought to a stop includes the case where the vehicle 2 is in a constant traveling state and the case where the vehicle 2 transitions from the shifting state where the vehicle 2 is being brought to a stop to the traveling state. This also includes the case where the vehicle 2 that has been in the shifting state where the vehicle 2 is being brought to a stop starts to accelerate again.

If the vehicle 2 is not in the shifting state where the vehicle 2 is being brought to a stop, a determination in step S1100 is made. In step S1100, it is determined whether the required driving force and the required braking force have been corrected so as to be raised. In step S900, when the required driving force and the required braking force are corrected so as to be raised, and in step S1200 described later, the raising amounts are not yet returned to zero, it is determined that the raising correction is being performed.

If it is determined in step S1100 that the raising correction of the required driving force and the required braking force is being performed, the process in step S1200 is performed. In step S1200, the raising process is canceled and the required braking force is returned to its original value. By canceling the raising process, it is possible to suppress the decrease in fuel efficiency due to shifting to an acceleration state or the constant traveling state with the braking force raised. The braking force raising amount is not rapidly reduced to zero, but gradually reduced at a predetermined calculation cycle as in the following Equation 10 and Equation 11. Equation 10 indicates that a larger value of the value, obtained by subtracting a braking force lowering jerk multiplied by the calculation cycle from the previous value of the braking force raising amount, and zero is selected as the braking force raising amount. In Equation 10, the braking force lowering jerk defines a reduction rate of the required braking force in each calculation cycle.

Braking force raising amount=max((Previous value of braking force raising amount−Braking force lowering jerk*Calculation cycle),0)  Equation 10

Required braking force after correction=Required braking force before correction+Braking force raising amount  Equation 11

Further, in step S1200, the required driving force is not rapidly reduced to zero, but gradually reduced at a predetermined calculation cycle as in the following Equation 12 and Equation 13. The meaning of Equation 12 is similar to that of Equation 10. In Equation 12, a driving force lowering jerk defines a reduction rate of the required driving force in each calculation cycle.

Driving force raising amount=max((Previous value of driving force raising amount−Driving force lowering jerk*Calculation cycle),0)  Equation 12

Required driving force after correction=Required driving force before correction+Driving force raising amount  Equation 13

In Equation 10 and Equation 12, the braking force lowering jerk and the driving force lowering jerk are set in consideration of the influence on the behavior of the vehicle 2. The braking force lowering jerk and the driving force lowering jerk may be set to 2.7 m/s³ as an example. The calculation cycle is, for example, 10 ms. Note that, as in the case in step S900, the values of the braking force raising amount and the driving force raising amount may be processed by the response compensation filter in consideration of the responsiveness of the brake 4 and the powertrain 3.

If it is determined in step S1100 that the raising correction of the required driving force and the required braking force are not being performed, the process in step S1300 is performed. In step S1300, the required braking force calculated in step S600 is applied from the braking force/driving force correction unit 16 to the brake control unit 18, and the brake 4 is controlled according to the required braking force. Further, the required driving force calculated in step S600 is applied from the braking force/driving force correction unit 16 to the powertrain control unit 17, and the powertrain 3 is controlled according to the required driving force.

4. Result of Braking Force/Driving Force Control According to First Embodiment Next, the effect of the braking force/driving force control according to the first embodiment will be described based on the actual control result. First, as a comparative example for the braking force/driving force control according to the first embodiment, the result of the braking force/driving force control in which a function of suppressing the vehicle 2 from moving backward is not installed will be described. Next, the result of the braking force/driving force control according to the first embodiment will be considered based on two examples.

FIG. 10 is a diagram showing a result of the braking force/driving force control of the comparative example. An upper graph of FIG. 10 shows the speed, and a lower graph shows the acceleration. The speed graph shows lines indicating changes in the required speed and the actual speed with elapse of time. The acceleration graph shows lines indicating changes in a required ground G, an actual ground G, a required driving G, a required braking G, a gradient G, a stopping G, and a total of the required driving G and the required braking G with the elapse of time. The required ground G indicates the required acceleration, the actual ground G indicates the actual acceleration, the required driving G indicates a value obtained by dividing the required driving force by the vehicle weight, the required braking G indicates a value obtained by dividing the required braking force by the vehicle weight, the gradient G indicates a component of the gravitational acceleration in a downward direction of the road surface, and the stopping G indicates a value obtained by dividing the maximum braking force calculated in Equation 4 by the vehicle weight.

FIG. 10 is a graph showing a control result when the traveling condition of the vehicle 2 transitions from the traveling state to the shifting state where the vehicle 2 is being brought to a stop, and further, from the shifting state where the vehicle 2 is being brought to a stop to the stopped state. Here, as preconditions, it is assumed that the vehicle 2 is traveling on an uphill road having the gradient G of 2 m/s², and a minimum driving force of the powertrain 3 is zero N. The same preconditions are used in the result of the braking force/driving force control according to the first embodiment described later.

In the control result of the comparative example, the actual speed is controlled so as to follow the required speed, and the actual ground G is controlled so as to follow the required ground G. The required speed and the actual speed both become zero, thus the vehicle 2 is in the stopped state. In the comparative example, the control for causing the actual ground G to follow the required ground G is performed only by the required driving G, and the required braking G is maintained at zero in the shifting state where the vehicle 2 is being brought to a stop, and even after the traveling condition of the vehicle 2 transitions from the shifting state where the vehicle 2 is being brought to a stop to the stopped state. However, in the comparative example, the required driving G after the vehicle 2 is stopped is insufficient with respect to the gradient G. After the vehicle 2 is stopped, the actual speed is smaller than zero even though the required speed is zero. This indicates that the vehicle 2 is moving backward. That is, when the function of suppressing the vehicle 2 from moving backward is not installed, the vehicle 2 may move backward on an uphill road as in the comparative example.

Figure 11:
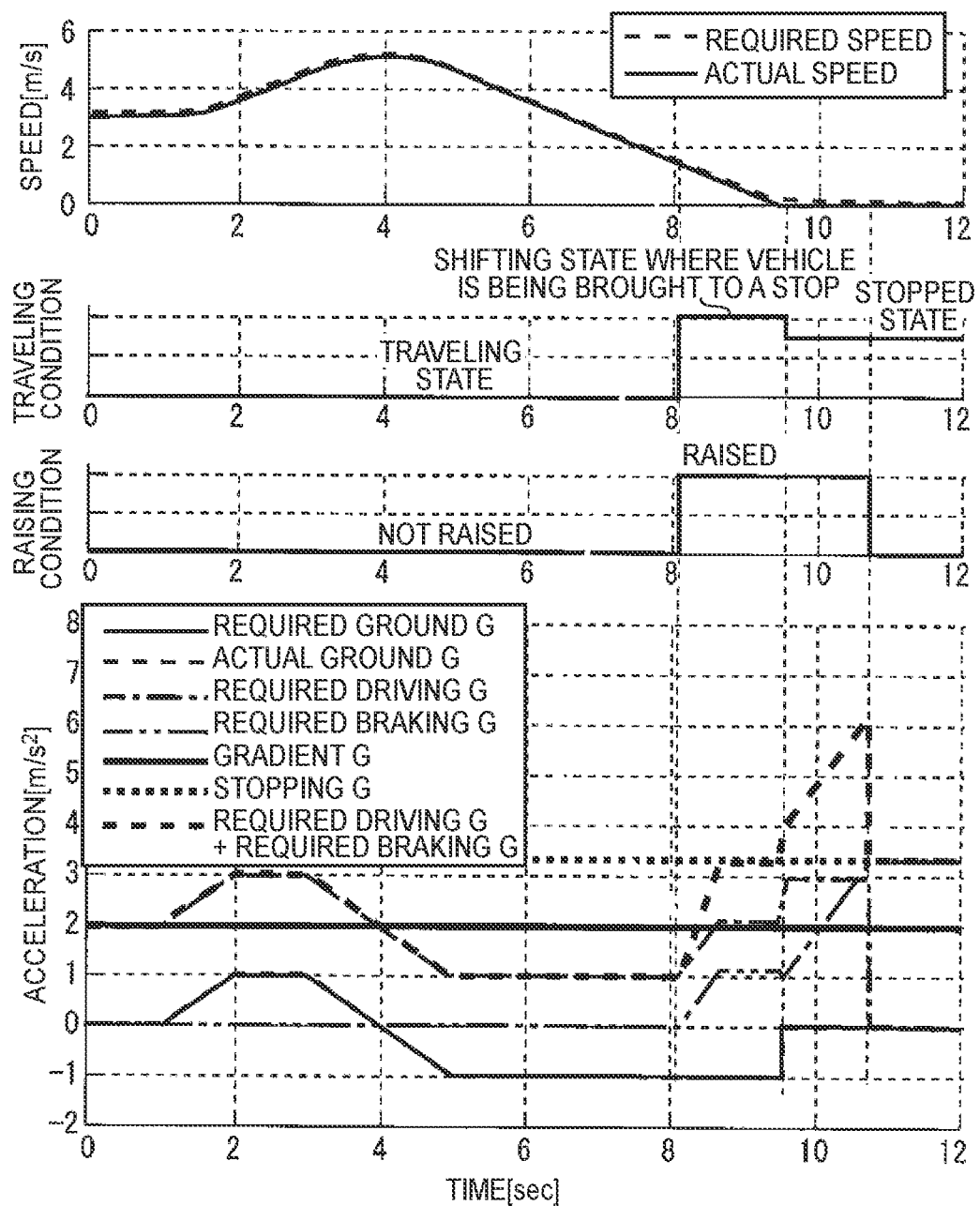
FIG. 11 shows graphs illustrating an example of a result of the braking force/driving force control according to the first embodiment of the present disclosure.

FIG. 11 shows an example of the result of the braking force/driving force control according to the first embodiment. In FIG. 11, an uppermost graph shows the speed, a second graph shows the traveling state, a third graph shows a raised state of the required braking G and the required driving G, and a lowermost graph shows the acceleration. As in the comparative example, FIG. 11 shows graphs illustrating a control result when the traveling condition of the vehicle 2 transitions from the traveling state to the shifting state where the vehicle 2 is being brought to a stop, and further, from the shifting state where the vehicle 2 is being brought to a stop to the stopped state.

A difference between the control result shown in FIG. 11 and the control result of the comparative example is the changes in the required braking G and the required driving G after the traveling state of the vehicle 2 transitions to the shifting state where the vehicle 2 is being brought to a stop. If the required speed and the actual speed are smaller than the predetermined speed when the required ground G is a negative value, it is determined that the traveling state of the vehicle 2 has transitioned from the traveling state to the shifting state where the vehicle 2 is being brought to a stop. When a flag indicating that the traveling state of the vehicle 2 is the shifting state where the vehicle 2 is being brought to a stop is established, it is determined whether the required braking G and the required driving G need to be corrected so as to be raised. In the control result shown in FIG. 11, since the gradient G is larger than the sum of the required braking G and the required driving G, it is determined that the required braking G and the required driving G need to be corrected so as to be raised. The above determinations correspond to step S700 and step S800 in the control flow shown in FIG. 9.

When a flag indicating the raising correction is established, the raising correction of the required braking G and the required driving G is started. The required braking G and the required driving G are gradually increased at a constant increase rate by the raising correction, and when the sum of the required braking G and the required driving G becomes equal to or larger than the stopping G, the values of the required braking G and the required driving G are maintained. This process corresponds to step S900 in the control flow shown in FIG. 9. When the vehicle 2 is stopped in this state, the vehicle 2 is inhibited from moving backward because the sum of the required braking G and the required driving G is larger than the gradient G.

When both the required speed and the actual speed become zero, it is determined that the traveling state of the vehicle 2 has transitioned from the shifting state where the vehicle 2 is being brought to a stop to the stopped state. This determination corresponds to step S100 in the control flow shown in FIG. 9. When a flag indicating the stopped state is established, the required braking G is gradually increased until the required braking G reaches the stopping G. This process corresponds to step S200 and step S400 in the control flow shown in FIG. 9. In the control result shown in FIG. 11, the required driving G is rapidly increased stepwise when the traveling condition of the vehicle 2 changes from the shifting state where the vehicle 2 is being brought to a stop to the stopped state. This corresponds to the required ground G being changed stepwise from a negative value to zero in response to the completion of stopping of the vehicle 2. While the required braking G is gradually increasing, the required driving G is maintained at a constant value.

After the required braking G reaches the stopping G, it is determined that the vehicle 2 can be stopped only by the braking force, and the required braking G is maintained at the stopping G. Meanwhile, the required driving G is decreased to zero. This process corresponds to step S200 and step S300 in the control flow shown in FIG. 9. Although the required driving G is rapidly reduced to zero, the required driving G may be gradually reduced as described in step S300. According to the control result shown in FIG. 11, the actual speed is not smaller than zero even after the traveling condition of the vehicle 2 has transitioned from the shifting state where the vehicle 2 is being brought to a stop to the stopped state. Thus, it can be understood that the braking force/driving force control according to the first embodiment can inhibit the vehicle 2 from moving backward.

Figure 12:
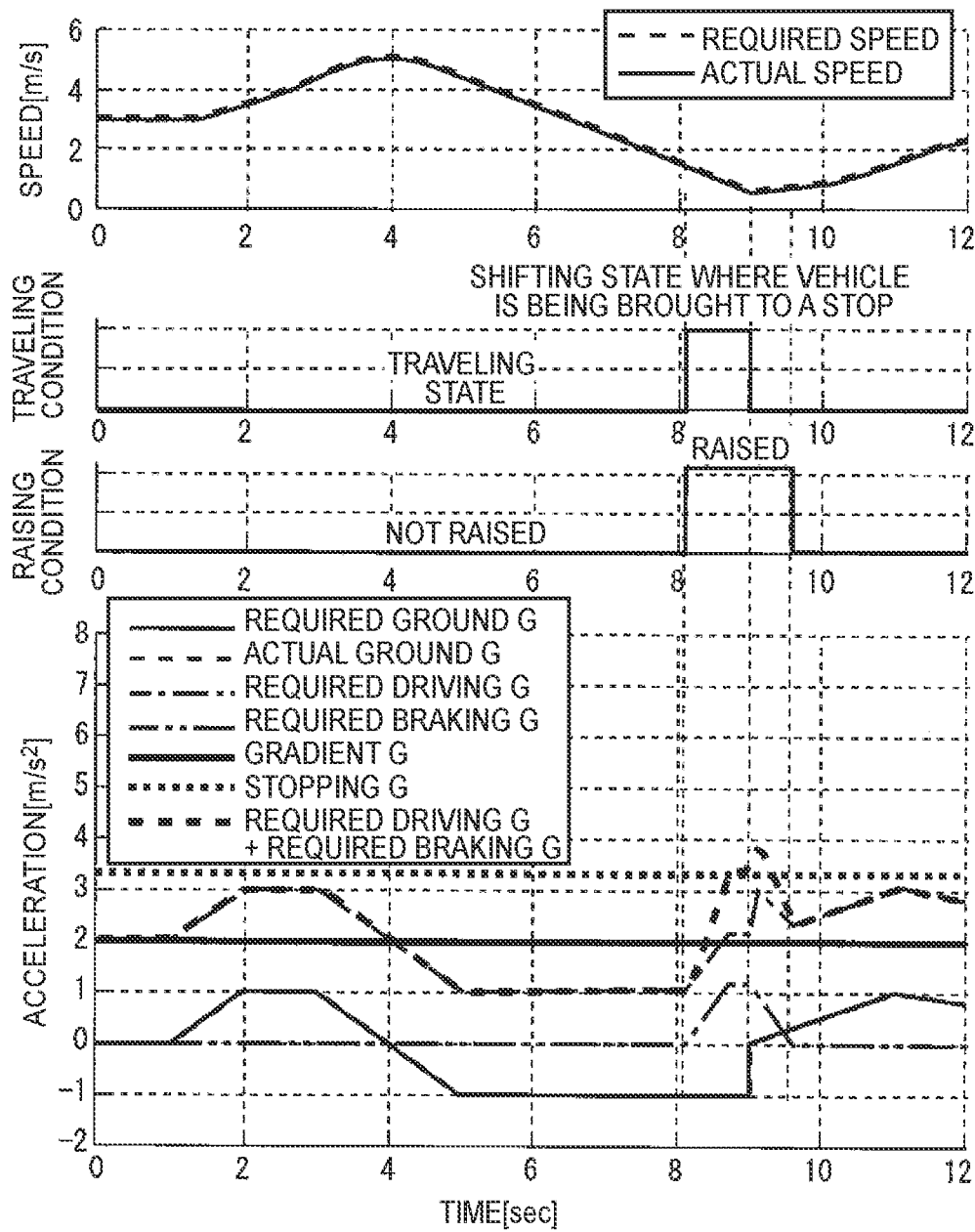
FIG. 12 shows graphs illustrating another example of the result of the braking force/driving force control according to the first embodiment of the present disclosure.

Next, another example of the result of the braking force/ driving force control according to the first embodiment will be described with reference to FIG. 12. In FIG. 12, an uppermost graph shows the speed, a second graph shows the traveling condition, a third graph shows a raised state of the required braking G and the required driving G, and a lowermost graph shows the acceleration. FIG. 12 shows graphs illustrating a control result in a case where the traveling condition of the vehicle 2 transitions from the traveling state to the shifting state where the vehicle 2 is being brought to a stop, and further, to the traveling state again from the shifting state where the vehicle 2 is being brought to a stop without being transitioned to the stopped state.

In the control result shown in FIG. 12, the required ground G changes from a negative value to a positive value during the shifting state where the vehicle 2 is being brought to a stop. Thereby, it is determined that the traveling condition of the vehicle 2 has transitioned from the shifting state where the vehicle 2 is being brought to a stop to the traveling state, and the flag for the shifting state where the vehicle 2 is being brought to a stop is unestablished. This determination corresponds to step S700 in the control flow shown in FIG. 9. When the flag for the stopped state is unestablished, the required braking G and the required driving G that have been raised during the shifting state where the vehicle 2 is being brought to a stop are gradually reduced at a constant reduction rate. This process corresponds to step S1100 and step S1200 in the control flow shown in FIG. 9. In the control result shown in FIG. 12, the required driving G is rapidly increased stepwise when the traveling condition of the vehicle 2 transitions from the shifting state where the vehicle 2 is being brought to a stop to the traveling state. This corresponds to the required ground G being changed stepwise from a negative value to a positive value in response to reacceleration of the vehicle 2.

Eventually, when the raising process is eliminated and the required braking G becomes zero, the raising correction flag is unestablished. After the raising correction flag is unestablished, the required driving G is increased in response to an increase in the required ground G while the required braking G is maintained at zero. This process corresponds to step S1100 and step S1300 in the control flow shown in FIG. 9. According to the control result shown in FIG. 12, the actual speed follows the change in the required speed from the shifting state where the vehicle 2 is being brought to a stop to the traveling state. Therefore, it can be understood that the braking force/driving force control according to the first embodiment can achieve a smooth transition from a deceleration state to the acceleration state. The control result shown in FIG. 12 represents the case where the vehicle 2 transitions from the deceleration state to the acceleration state. However, according to the braking force/driving force control according to the first embodiment, a smooth transition can be achieved even when the vehicle 2 transitions from the deceleration state to the constant traveling state.

Figure 13:
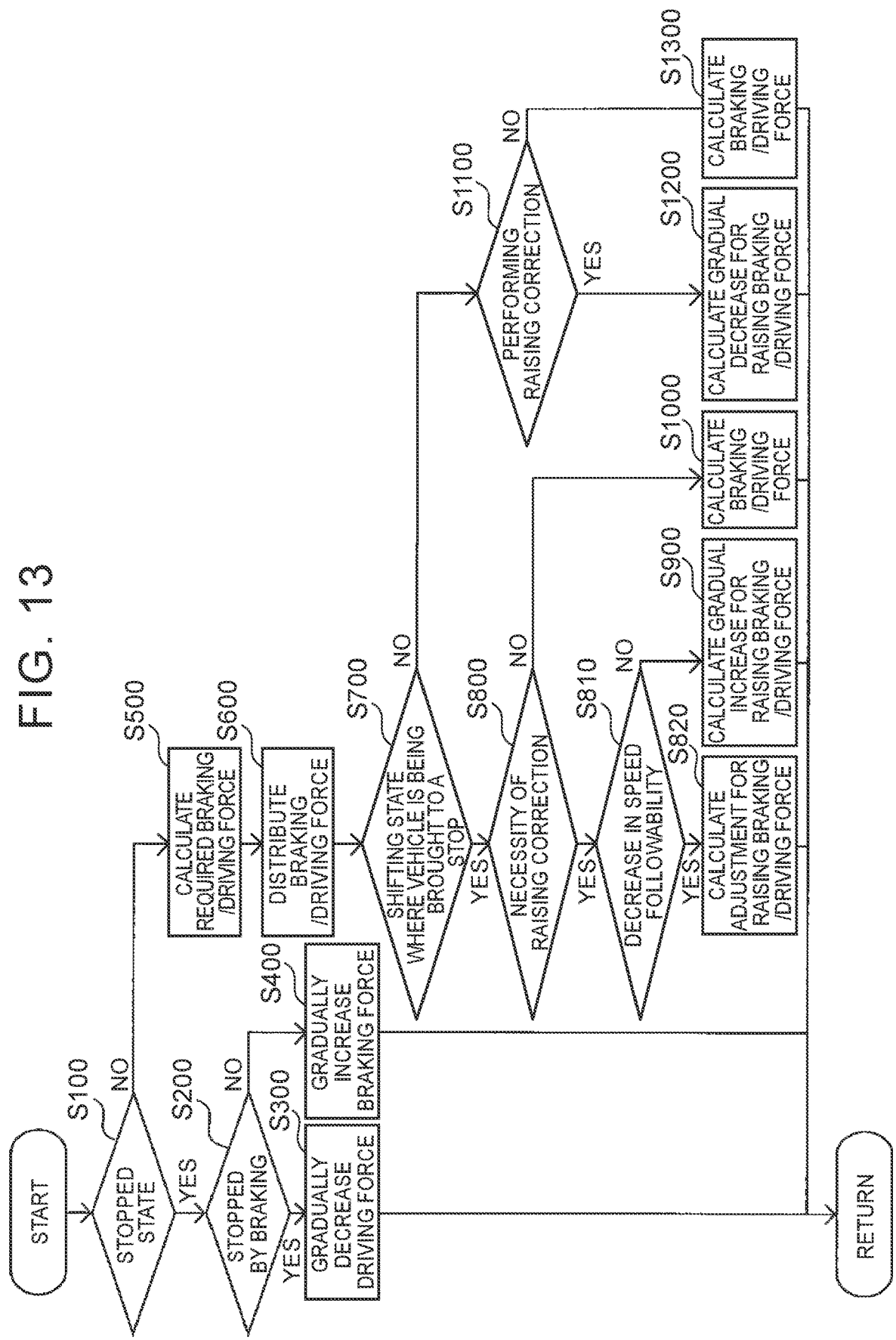
FIG. 13 is a flowchart showing a flow of a braking force/driving force control according to a second embodiment of the present disclosure.

5. Details of Braking Force/Driving Force Control According to Second Embodiment Next, a braking force/driving force control according to a second embodiment of the present disclosure will be described. FIG. 13 is a flowchart showing a flow of the braking force/driving force control performed by the vehicle control device 10 according to the second embodiment. The vehicle control device 10 repeatedly performs the processes shown in the flowchart. Hereinafter, the flow of the braking force/driving force control according to the second embodiment will be described with reference to the flowchart. However, in the control flow shown in FIG. 13, descriptions of the same determinations and processes as those in the control flow of the first embodiment are omitted or simplified.

In the control flow shown in FIG. 13, if it is determined in step S800 that the required driving force and the required braking force need to be corrected so as to be raised, the determination in step S810 is performed, and a process in either step S820 or step S900 is performed according to the determination result. The required driving force and the required braking force is corrected so as to be raised so that the increase in the driving force cancels out the increase in the braking force. However, since errors occur in the operations of the powertrain 3 and the brake 4, it can be assumed that the braking force is actually insufficient and a followability of the actual speed to the required speed decreases. Step S810 is a step for confirming whether there is a decrease in the followability of the actual speed with respect to the required speed.

In step S810, if the actual speed is increased during the shifting state where the vehicle 2 is being brought to a stop, it is determined that the followability of the actual speed with respect to the required speed has decreased. Also, when the state where the required speed is zero during the shifting state where the vehicle 2 is being brought to a stop continues for a certain period of time (for example, 1 second), that is, when the actual speed does not become zero even after a certain period of time elapses after the required speed becomes zero, it is determined that a speed followability has decreased.

If no decrease in the speed followability is confirmed in step S810, the process in step S900 is performed in the same manner as in the first embodiment. Meanwhile, when it is confirmed that the speed followability has decreased, the process in step S820 is performed. In step S820, the raising amounts of the required braking force and the required driving force are adjusted according to the following Equation 14 and Equation 15.

Braking force raising amount=min((Previous value of braking force raising amount+Braking force raising jerk*Calculation cycle),Required raising amount)      Equation 14

Driving force raising amount=max((Previous value of driving force raising amount−Driving force lowering jerk*Calculation cycle),0)      Equation 15

Equation 14 is equal to Equation 6 described above and Equation 15 is equal to Equation 12 described above. That is, when the speed followability decreases, the required driving force is gradually reduced while the required braking force is gradually increased. By performing this process, the deceleration force acting on the vehicle 2 is increased, thereby promoting the reduction in the actual speed. In Equation 15, the value of the driving force lowering jerk may be zero. By only maintaining the driving force raising amount while increasing the braking force raising amount, the actual speed can be reduced and the speed followability can be improved.

Figure 14:
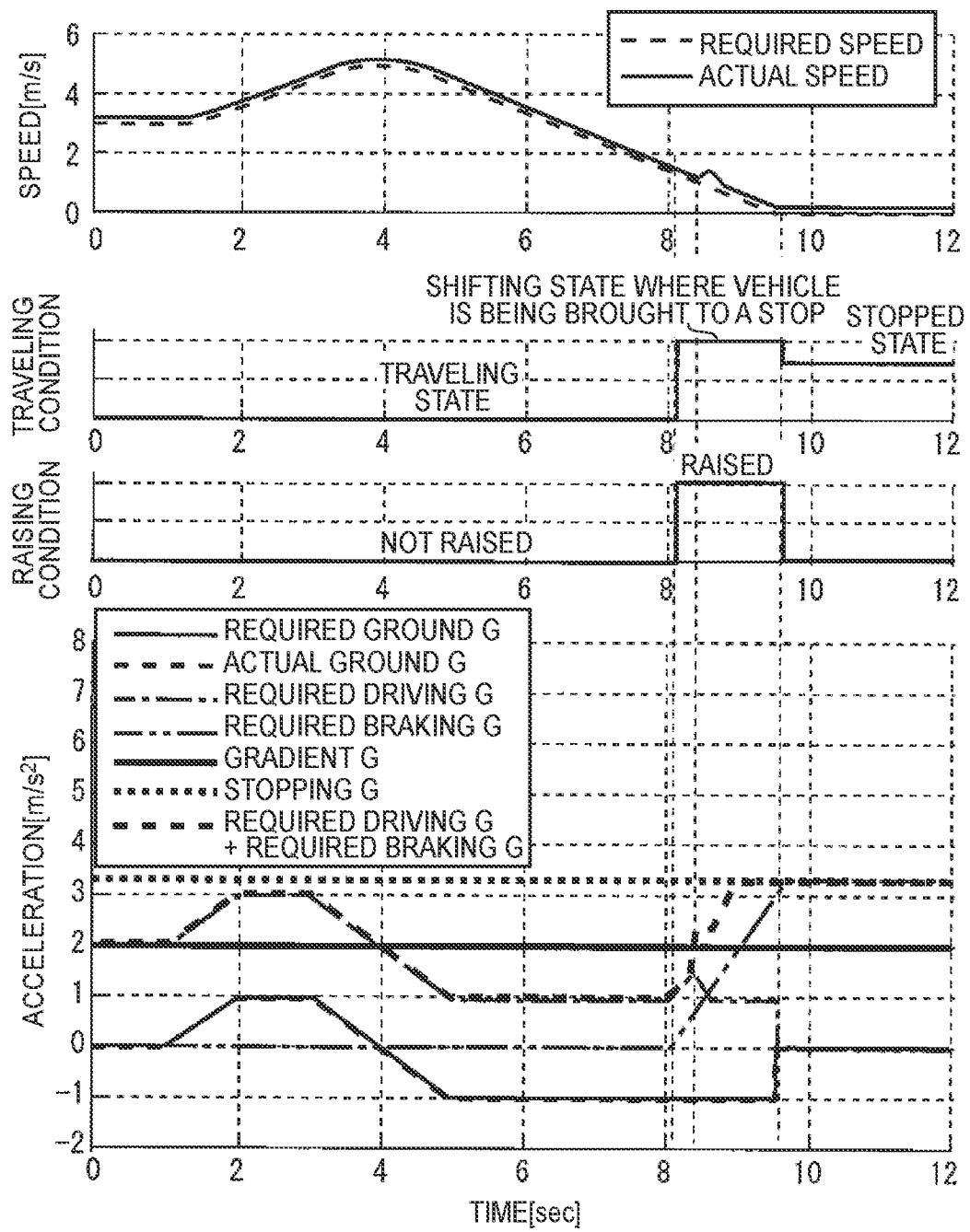
FIG. 14 shows graphs illustrating an example of the result of a braking force/driving force control according to the second embodiment of the present disclosure.

6. Result of Braking Force/Driving Force Control According to Second Embodiment Next, an example of the result of the braking force/driving force control according to the second embodiment will be described with reference to FIG. 14. In FIG. 14, an uppermost graph shows the speed, a second graph shows the traveling state, a third graph shows a raised state of the required braking G and the required driving G, and a lowermost graph shows the acceleration. FIG. 14 is a graph showing a control result in a case where the speed followability decreases after the traveling condition of the vehicle 2 transitions from the traveling state to the shifting state where the vehicle 2 is being brought to a stop.

In the control result shown in FIG. 14, the actual speed increases during the shifting state where the vehicle 2 is being brought to a stop. When it is determined that the actual speed is increased during the shifting state where the vehicle 2 is being brought to a stop, the required driving G is gradually reduced at a constant reduction rate while the required braking G is gradually increased. This process corresponds to step S810 and step S820 in the control flow shown in FIG. 13. According to the control result shown in FIG. 14, as a result of gradually reducing the required driving G, the actual speed that has once deviated from the required speed follows the required speed again. Therefore, according to the braking force/driving force control according to the second embodiment, it can be understood that it is possible to ensure the followability of the actual speed with respect to the required speed while inhibiting the vehicle 2 from moving backward.

In the control result shown in FIG. 14, the gradual reduction of the required driving G is stopped at the timing when the raising amount of the required driving G becomes zero, and the required driving G is maintained as it is. The required driving G is reduced to zero at the timing when the required braking G reaches the stopping G. However, after the decrease in the speed followability is eliminated, the required driving G may be gradually increased again together with the required braking G based on the process in step S900.

7. Other Embodiments

A correction performing condition, which is a condition for performing the process of correcting the required driving force and the required braking force so as to increase the required driving force and the required braking force, may be only that the vehicle is decelerating. That is, the required driving force and the required braking force may be corrected so as to be increased on the condition that the vehicle is decelerating. This is because when the vehicle is decelerating, the vehicle is likely to stop before long, and the vehicle may stop on an uphill road. By setting the fact that the vehicle is decelerating as the correction performing condition, it is possible to suppress the vehicle after being stopped from moving backward without being affected by the response delay of the braking actuator or the driving actuator. It goes without saying that correction performing conditions may be set by combining the above condition with other conditions described later.

Further, the correction performing condition may be only that the actual speed and the required speed of the vehicle are each smaller than a predetermined speed. That is, the required driving force and the required braking force may be corrected so as to be increased on the condition that the required speed of the vehicle is decreased followed by the decrease in the actual speed. This is because when both the actual speed and the required speed of the vehicle are low, the vehicle is likely to stop before long, and the vehicle may stop on the uphill road. By setting the fact that the actual speed and the required speed of the vehicle are each smaller than the predetermined speed as the correction performing condition, it is possible to suppress the vehicle after being stopped from moving backward without being affected by the response delay of the braking actuator or the driving actuator. It goes without saying that correction performing conditions may be set by combining the above condition with other conditions described later.

The correction performing condition may be only that the vehicle is traveling on an uphill road. That is, the required driving force and the required braking force may be corrected so as to be increased on the condition that the vehicle is traveling on an uphill road. This is because when the vehicle is traveling on an uphill road, the vehicle may stop on the uphill road. By setting the fact that the vehicle is traveling on an uphill road as the correction performing condition, it is possible to suppress the vehicle after being stopped from moving backward without being affected by the response delay of the braking actuator or the driving actuator. It goes without saying that correction performing conditions may be set by combining the above condition with other conditions described later.

Further, the correction performing condition may be only that the magnitude of the gravity component acting on the vehicle in the movement direction of the vehicle is larger than the sum of the magnitude of the required driving force and the magnitude of the required braking force. When the magnitude of the gravity component acting on the vehicle in the movement direction of the vehicle is larger than the sum of the magnitude of the required driving force and the magnitude of the required braking force, the vehicle is likely to stop before long, and the vehicle may stop on the uphill road. In consideration of the errors in the road surface gradient and the vehicle weight, the correction performing condition may be set to the fact that the right side of Equation 5 is larger than zero.

What is claimed is:
1. A vehicle control device mounted on a vehicle including a driving actuator configured to apply a driving force and a braking actuator configured to apply a braking force, the vehicle control device comprising a processor configured to:

set a required driving force required of the driving actuator and a required braking force required of the braking actuator, such that an acceleration acting on the vehicle in a movement direction of the vehicle satisfies a required acceleration based on the required acceleration for the vehicle and a component of gravity acting on the vehicle in the movement direction of the vehicle;

control the driving actuator based on the required driving force;

control the braking actuator based on the required braking force; and correct, when a predetermined condition including at least that the vehicle is decelerating is satisfied, the required driving force and the required braking force so as to increase both of the required driving force and the required braking force simultaneously such that a sum of a magnitude of the required driving force and a magnitude of the required braking force is equal to or larger than a magnitude of the component of the gravity acting on the vehicle in the movement direction of the vehicle.

2. The vehicle control device according to claim 1, wherein the predetermined condition includes that each of an actual speed and a required speed of the vehicle is smaller than a predetermined speed.

3. The vehicle control device according to claim 1, wherein the predetermined condition includes that the vehicle is traveling on an uphill road.

4. The vehicle control device according to claim 1, wherein the predetermined condition includes that the magnitude of the component of the gravity acting on the vehicle in the movement direction of the vehicle is larger than the sum of the magnitude of the required driving force and the magnitude of the required braking force.

5. The vehicle control device according to claim 1, wherein the processor is configured to correct the required driving force and the required braking force so as to increase the required driving force and the required braking force by a same value.

6. The vehicle control device according to claim 5, wherein the processor is configured to set a value that is equal to or larger than half of a value obtained by subtracting the sum of the magnitude of the required driving force and the magnitude of the required braking force from the magnitude of the component of the gravity acting on the vehicle in the movement direction of the vehicle, as a raising amount for each of the required driving force and the required braking force, and to correct the required driving force and the required braking force so as to increase the required driving force and the required braking force by the raising amount.

7. The vehicle control device according to claim 1, wherein the processor is configured to gradually increase, when the predetermined condition is satisfied, the required driving force and the required braking force to a corrected required driving force and a corrected required braking force.

8. The vehicle control device according to claim 1, wherein the processor is configured to recorrect, when a condition of the vehicle transitions from a deceleration state to an acceleration state or a constant traveling state after the predetermined condition is satisfied, the required driving force and the required braking force, which have been corrected so as to be increased, so as to reduce the required driving force and the required braking force.

9. The vehicle control device according to claim 8, wherein the processor is configured to gradually reduce, when the condition of the vehicle transitions from the deceleration state to the acceleration state or the constant traveling state after the predetermined condition is satisfied, the required driving force and the required braking force, which have been corrected so as to be increased, toward the required driving force and the required braking force before being subjected to correction.

10. The vehicle control device according to claim 1, wherein the processor is configured to reduce the required driving force or increase the required braking force when a decrease in followability of the actual speed of the vehicle with respect to the required speed of the vehicle is confirmed after the predetermined condition is satisfied and the required driving force and the required braking force is corrected so as to be increased.

11. A vehicle control device mounted on a vehicle including a driving actuator configured to apply a driving force and a braking actuator configured to apply a braking force, the vehicle control device comprising a processor configured to:

set a required driving force required of the driving actuator and a required braking force required of the braking actuator, such that an acceleration acting on the vehicle in a movement direction of the vehicle satisfies a required acceleration based on the required acceleration for the vehicle and a component of gravity acting on the vehicle in the movement direction of the vehicle;

control the driving actuator based on the required driving force;

control the braking actuator based on the required braking force; and correct, when a predetermined condition including at least that each of an actual speed of the vehicle and a required speed of the vehicle is smaller than a predetermined speed is satisfied, the required driving force and the required braking force so as to increase both of the required driving force and the required braking force simultaneously such that a sum of a magnitude of the required driving force and a magnitude of the required braking force is equal to or larger than a magnitude of the component of the gravity acting on the vehicle in the movement direction of the vehicle.

12. A vehicle control device mounted on a vehicle including a driving actuator configured to apply a driving force and a braking actuator configured to apply a braking force, the vehicle control device comprising a processor configured to:

set a required driving force required of the driving actuator and a required braking force required of the braking actuator, such that an acceleration acting on the vehicle in a movement direction of the vehicle satisfies a required acceleration based on the required acceleration for the vehicle and a component of gravity acting on the vehicle in the movement direction of the vehicle;

control the driving actuator based on the required driving force;

control the braking actuator based on the required braking force; and correct, when a predetermined condition including at least that the vehicle is traveling on an uphill road is satisfied, the required driving force and the required braking force so as to increase both of the required driving force and the required braking force simultaneously such that a sum of a magnitude of the required driving force and a magnitude of the required braking force is equal to or larger than a magnitude of the component of the gravity acting on the vehicle in the movement direction of the vehicle.

13. A vehicle control device mounted on a vehicle including a driving actuator configured to apply a driving force and a braking actuator configured to apply a braking force, the vehicle control device comprising a processor configured to:
- set a required driving force required of the driving actuator and a required braking force required of the braking actuator, such that an acceleration acting on the vehicle in a movement direction of the vehicle satisfies a required acceleration based on the required acceleration for the vehicle and a component of gravity acting on the vehicle in the movement direction of the vehicle;
- control the driving actuator based on the required driving force;
- control the braking actuator based on the required braking force; and
- correct, when a predetermined condition including at least that a magnitude of the component of the gravity acting on the vehicle in the movement direction of the vehicle is larger than a sum of a magnitude of the required driving force and a magnitude of the required braking force is satisfied, the required driving force and the required braking force so as to increase both of the required driving force and the required braking force simultaneously such that the sum of the magnitude of the required driving force and the magnitude of the required braking force is equal to or larger than the magnitude of the component of the gravity acting on the vehicle in the movement direction of the vehicle.

\* \* \* \* \*